United States Patent
Kado

(10) Patent No.: US 10,139,718 B2
(45) Date of Patent: Nov. 27, 2018

(54) ILLUMINATION DEVICE AND IMAGE PROJECTION APPARATUS

(71) Applicant: Takahiro Kado, Kanagawa (JP)

(72) Inventor: Takahiro Kado, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/892,703

(22) Filed: Feb. 9, 2018

(65) Prior Publication Data
US 2018/0239233 A1    Aug. 23, 2018

(30) Foreign Application Priority Data
Feb. 23, 2017 (JP) .................................. 2017-032527

(51) Int. Cl.
G03B 21/20 (2006.01)
G03B 21/16 (2006.01)
G02B 27/28 (2006.01)
G03B 33/08 (2006.01)
G02B 26/00 (2006.01)

(52) U.S. Cl.
CPC ....... G03B 21/2093 (2013.01); G03B 21/204 (2013.01); G03B 21/2073 (2013.01); *G02B 26/008* (2013.01); *G02B 27/283* (2013.01); *G03B 21/16* (2013.01); *G03B 33/08* (2013.01)

(58) Field of Classification Search
CPC .......................... G03B 21/204; G02B 26/008
See application file for complete search history.

(56) References Cited

U.S. PATENT DOCUMENTS

| 2013/0010264 A1 | 1/2013 | Takahashi et al. |
| 2013/0242534 A1 | 9/2013 | Pettitt et al. |
| 2013/0314672 A1 | 11/2013 | Ogura |
| 2015/0124431 A1 | 5/2015 | Motoya et al. |
| 2016/0033854 A1 | 2/2016 | Pettitt et al. |
| 2017/0201730 A1 | 7/2017 | Jeoung et al. |

FOREIGN PATENT DOCUMENTS

| EP | 2 544 048 A1 | 1/2013 |
| JP | 2005-057457 | 3/2005 |
| JP | 2015-28504 A | 2/2015 |
| WO | WO 2015/183053 A1 | 12/2015 |

OTHER PUBLICATIONS

Extended European Search Report dated May 2, 2018 in European Patent Application No. 18157814.7 citing documents AA-AE and AO-AQ therein, 36 pages.

*Primary Examiner* — Christina Riddle
*Assistant Examiner* — Christopher Lamb, II
(74) *Attorney, Agent, or Firm* — Oblon, McClelland, Maier & Neustadt, L.L.P.

(57) ABSTRACT

An image projection apparatus includes an illumination device, an optical-path forming section, an image forming element, a projection optical section, and an optical component. The illumination device includes a fluorescence generator; a wavelength selector having a first area and a second area; and a polarization converter; and an optical-path switcher. The wavelength selector alternately sets the first area and the second area in an optical path of the first light in a temporal manner. The illumination device switches a first optical path and a second optical path based on a setting of the wavelength selector.

7 Claims, 16 Drawing Sheets

ILLUMINATION DEVICE AND IMAGE PROJECTION APPARATUS

CROSS-REFERENCE TO RELATED APPLICATION

This patent application is based on and claims priority pursuant to 35 U.S.C. § 119(a) to Japanese Patent Application No. 2017-032527, filed on Feb. 23, 2017 in the Japan Patent Office, the entire disclosure of which is hereby incorporated by reference herein.

BACKGROUND

Technical Field

Embodiments of the present disclosure relate to an illumination device and an image projection apparatus.

Background Art

In recent years, large-screen display devices have been rapidly becoming widespread, and such display devices are coming into common use in, e.g., meetings, presentations, and training. As an example of such a display device, an image projection apparatus (that is, a projector) is used that projects an image onto, e.g., a screen, to enlarge and display the image thereon.

SUMMARY

In one aspect of this disclosure, there is provided an improved image projection apparatus including an illumination device; an optical-path forming section to define an optical path of illumination light emitted from the illumination device; an image forming element disposed in the optical path of the illumination light to form an image with the illumination light; a projection optical section to project the image to an outside of the image projection apparatus; and an optical component disposed in an optical path from an exit end of the optical-path switcher to an exit end of the projection optical section. The illumination device includes a light source to emit first light having a first linear polarization component; a fluorescence generator to generate, with excitation light of the first light, fluorescence having a wavelength longer than a wavelength of the first light; a wavelength selector; a polarization converter to alternately change the first light between linearly polarized light and circular polarized light; and an optical-path switcher to guide the first light and the fluorescence to the polarization converter while guiding second light having a second linear polarization component perpendicular to the first linear polarization component to the fluorescence generator. The wavelength selector has a first area to transmit the first light through the first area, and a second area to reflect the first light and transmit the fluorescence through the second area. The optical component is one of: a mirror having an average reflectance of wavelengths of 400 nm or more and less than 500 nm being lower than an average reflectance of wavelengths of 500 nm or more and less than 800 nm; and a lens having an average transmittance of wavelengths of 400 nm or more and less than 500 nm being lower than an average transmittance of wavelengths of 500 nm or more and less than 800 nm. The wavelength selector alternately sets the first area and the second area in an optical path of the first light in a temporal manner. The illumination device switches a first optical path and a second optical path based on a setting of the wavelength selector. In the first optical path, the first light sequentially passes through the optical-path switcher, the polarization converter, and the first area of the wavelength selector to become first illumination light. In the second optical path, the first light sequentially passes through the optical-path switcher and the polarization converter and is reflected by the second area of the wavelength selector, the first light is changed to the second light by the polarization converter, the second light passes through the optical-path switcher and is directed to the fluorescence generator to generate fluorescence, the fluorescence sequentially passes through the optical-path switcher, the polarization converter, and the second area of the wavelength selector to become second illumination light and travel in a direction same as a direction of the first illumination light.

In another aspect of this disclosure, there is provided an improved illumination device including: a light source to emit first light having a first linear polarization component; a fluorescence generator to generate, with excitation light of the first light, fluorescence having a wavelength longer than a wavelength of the first light; a wavelength selector; a polarization converter to alternately change the first light between linearly polarized light and circular polarized light; an optical-path switcher to guide the first light and the fluorescence to the polarization converter while guiding second light having a second linear polarization component perpendicular to the first linear polarization component to the fluorescence generator; and an optical component disposed in an optical path from an exit end of the optical-path switcher to an exit end of the wavelength selector. The wavelength selector has a first area to transmit the first light through the first area; and a second area to reflect the first light and transmit the fluorescence through the second area. The optical component is one of: a mirror having an average reflectance of wavelengths of 400 nm or more and less than 500 nm being lower than an average reflectance of wavelengths of 500 nm or more and less than 800 nm; and a lens having an average transmittance of wavelengths of 400 nm or more and less than 500 nm being lower than an average transmittance of wavelengths of 500 nm or more and less than 800 nm. The wavelength selector alternately sets the first area and the second area in an optical path of the first light in a temporal manner. A first optical path and a second optical path are switched based on a setting of the wavelength selector. In the first optical path, the first light sequentially passes through the optical-path switcher, the polarization converter, and the first area of the wavelength selector to become first illumination light. In the second optical path, the first light sequentially passes through the optical-path switcher and the polarization converter and is reflected by the second area of the wavelength selector, the first light is changed to the second light by the polarization converter, the second light passes through the optical-path switcher and is directed to the fluorescence generator to generate fluorescence, the fluorescence passes through sequentially passes through the optical-path switcher, the polarization converter, and the second area of the wavelength selector to become second illumination light and travel in a direction same as a direction of the first illumination light.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
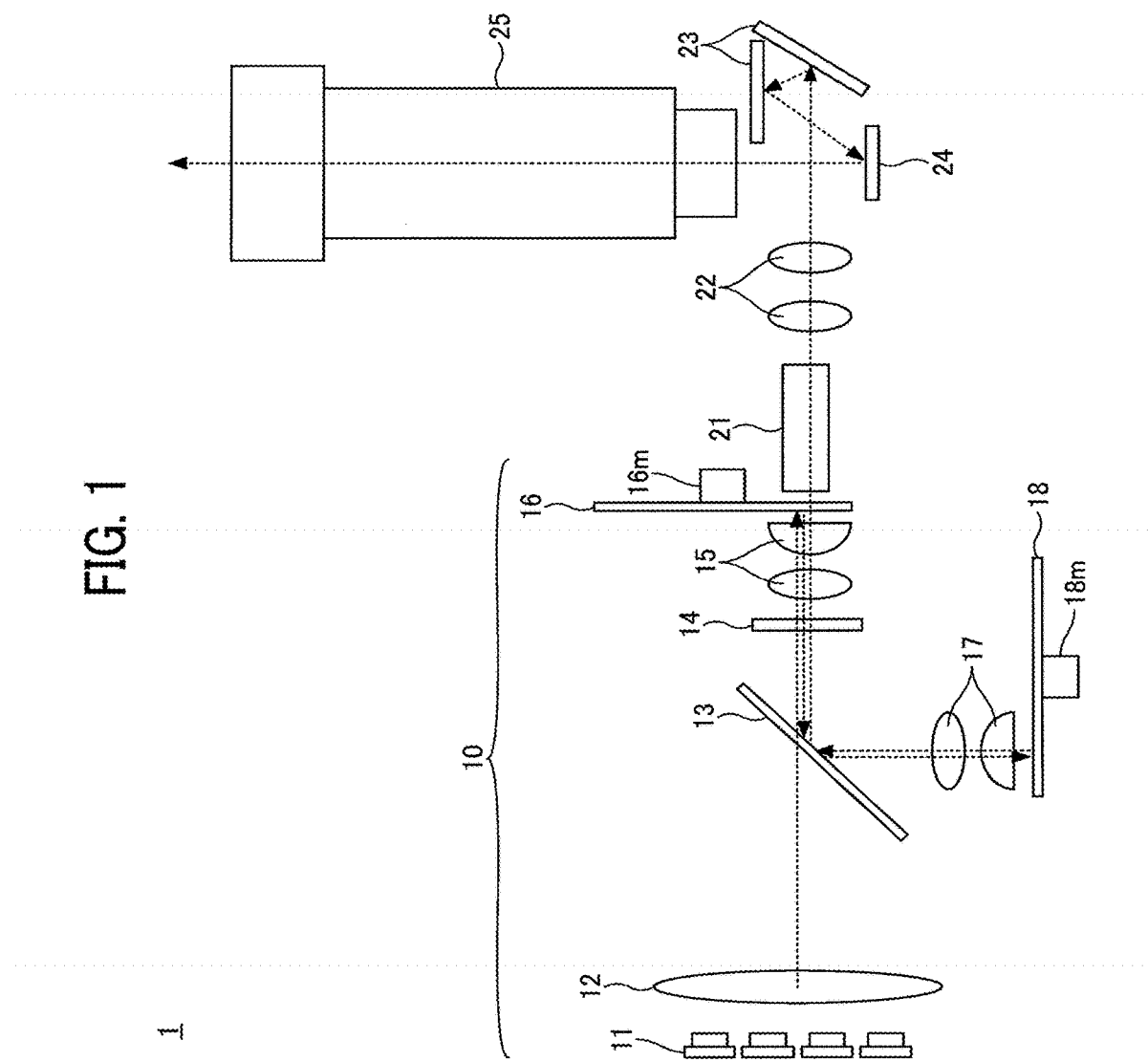
FIG. 1 is a schematic illustration of an example of an image projection apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

First Embodiment

FIG. 1 is a schematic illustration of an example of an image projection apparatus according to a first embodiment of the present disclosure. As illustrated in FIG. 1, the image projection apparatus 1 includes an illumination device 10, a light tunnel 21, a lens group 22, a mirror group 23, an image forming element 24, and a projection optical section 25.

The illumination device 10 includes a light source 11, a condenser lens 12, a wavelength-selective polarization splitter 13, a quarter wavelength plate 14, a first lens group 15, a color wheel 16, a second lens group 17, and a phosphor wheel 18. The illumination device 10 is designed to sequentially emit the blue, red, and green light rays toward the light tunnel 21 in the common direction (along the common optical path), in time division.

In the illumination device 10, the light source 11 emits a first light beam having a first linear polarization component. In the present embodiment for an example of the illumination device 10, cases where the light source 11 is a laser diode (LD) that emits a blue laser beam of a wavelength $\lambda B$ having a P polarization component (a P wave) are described. The wavelength $\lambda B$ is, for example, in the range of greater than 400 nanometer (nm) and less than 470 nm.

However, no limitation is intended thereby. Thus, alternatively, in some embodiments, the light source 11 is a light emitting diode (LED) that emits a blue light beam, or an organic electro luminescence (EL) device. Alternatively, in some other embodiments, the light source 11 is a combination of the LED and the organic EL. Alternatively, in still some other embodiments, the light source 11 is any one of, e.g., a laser diode (LD), an LED, and an organic EL device for emitting light with an ultraviolet region wavelength. Alternatively, the light source 11 is a combination of these LD, LED, and organic EL device.

The illumination device 10 includes a single light source 11 or a plurality of light sources 11. Further, between the light source 11 and the condenser lens 12, a coupling lens for guiding the laser beam emitted from the light source 11 to the condenser lens 12 as an approximately collimated light beam is provided.

The blue laser light emitted from the light source 11 is used as first illumination light. Further, the blue laser light emitted from the light source 11 is used as excitation light that causes fluorescence in the phosphor wheel 18.

Figure 2:
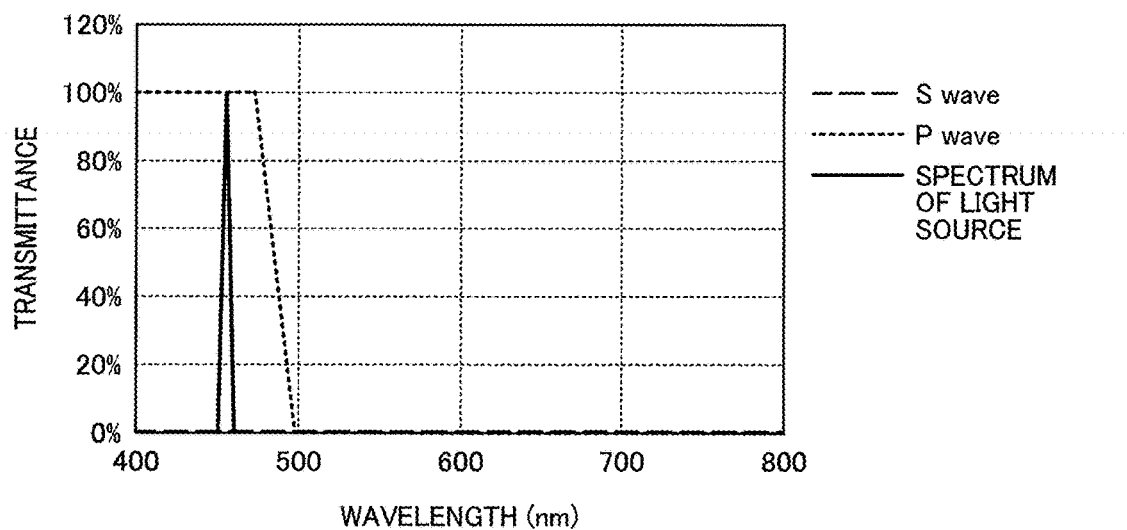
FIG. 2 is a graph for exemplifying spectral transmittance characteristics of a wavelength-selective polarization splitter used in the image projection apparatus in FIG. 1.

The blue laser light emitted from the light source 11 passes through the condenser lens 12 and is directed to the wavelength-selective polarization splitter 13 as an approximately collimated light beam. The wavelength-selective polarization splitter 13 is, for example, an optical-path switcher that has spectral transmittance characteristics as illustrated in FIG. 2.

Further, the wavelength-selective polarization splitter 13 has characteristics that transmits a P wave therethrough and fails to transmit an S wave (reflect the S wave) of the wavelength λB of the light emitted from the light source 11. As can be seen from the spectral transmittance characteristics of FIG. 2, irrespective of whether it is the P wave or the S wave (regardless of polarization characteristics), light having a wavelength of approximately 500 nm or greater is reflected by the wavelength-selective polarization splitter 13. For example, a polarization beam splitter is used as the wavelength-selective polarization splitter 13.

As illustrated in FIG. 1, the P-wave blue laser light having entered the wavelength-selective polarization splitter 13 passes through the wavelength-selective polarization splitter 13, and is directed to the quarter wavelength plate 14 as a polarization converter that changes the linearly polarized light into the circular polarized light and vice versa. The light transmitted through the quarter wavelength plate 14 changes from P-wave (P-polarized light) to circularly polarized light, and passes through the first lens group 15, entering the color wheel 16 as a wavelength selector.

Note that the polarization converter is not limited to the quarter wavelength plate, and may be, for example, a product obtained by forming an oblique deposited film, such as Ta 205, on an incident surface of any lens that constitutes the first lens group 15. The oblique evaporated film is a film obtained by the process in which a deposition target is disposed obliquely relative to a direction of fly of deposition material (orientation of a deposition source), and the deposition material is deposited obliquely relative to a normal line of a certain surface of the deposition target.

The first lens group 15 is constituted by combining, for example, a biconvex lens and a plano-convex lens as appropriate. The first lens group 15 serves to converge the approximately collimated light beam into a spot on the color wheel 16. The first lens group 15 further serves to collect and change light diverging from the color wheel 16 into a substantially parallel light beam (approximately collimated light beam).

Figure 3:
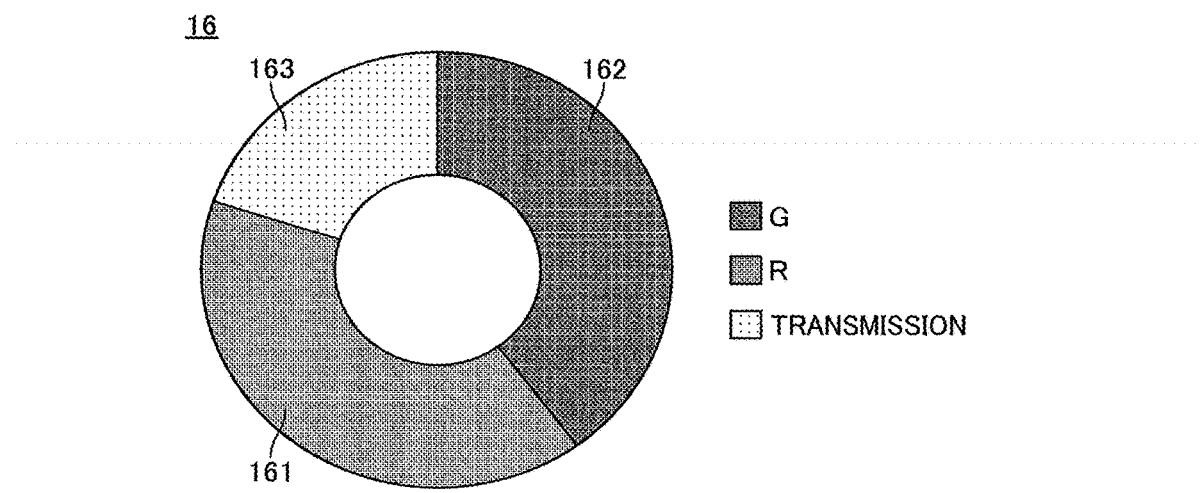
FIG. 3 is an enlarged plan view of a color wheel used in the image projection apparatus in FIG. 1.

FIG. 3 is an enlarged plan view of the color wheel 16 according to the first embodiment when viewed from an incident side of the color wheel 16. As illustrated in FIG. 3, the color wheel 16 according to the present embodiment has a configuration in which a disk-shaped member is divided into a plurality of fan-shaped areas (segments). Specifically, the color wheel 16 is divided into three fan-shaped areas (segments) of a red (R) area 161, a green (G) area 162, and a transmissive area 163.

Figure 4:
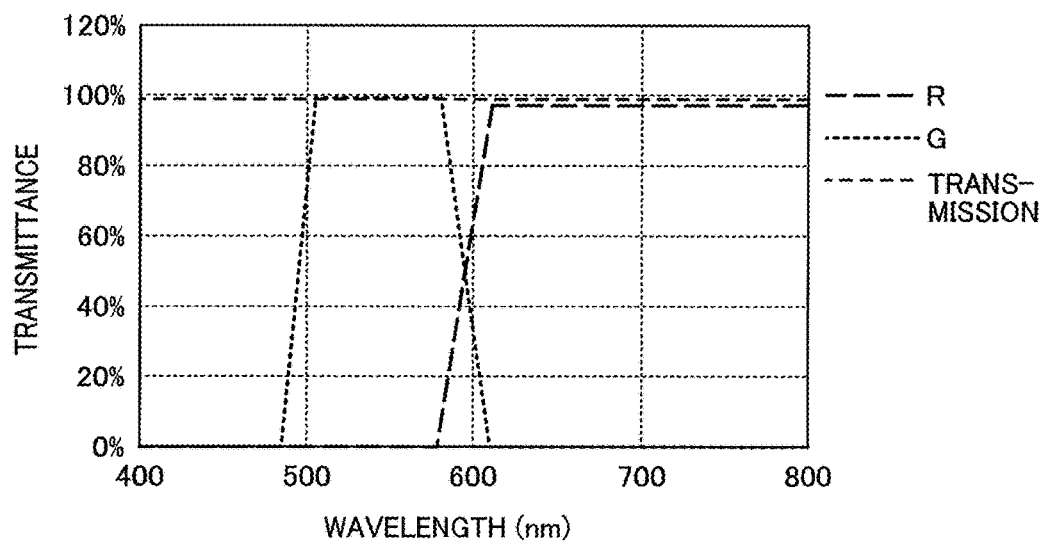
FIG. 4 is a graph for exemplifying spectral transmittance characteristics of the color wheel of FIG. 3.

The color wheel 16 has, for example, spectral transmittance characteristics as illustrated in FIG. 4. The red (R) area 161 is an area in which a filter that transmits red light is formed. As illustrated in FIG. 4, light in a wavelength range of approximately 600 nm or greater is transmitted through the red (R) area 161, and light in the other wavelength range is reflected by the red (R) area 161. The green (G) area 162 is an area in which a filter that transmits green light is formed. As illustrated in FIG. 4, light in a wavelength range of approximately 500 nm to 580 nm is transmitted through the green (G) area 162, and light in the other wavelength range is reflected by the green (G) area 162.

The transmissive area 163 transmits light in all wavelength ranges therethrough. In some embodiments, the transmissive area 163 is, for example, a transparent glass or a transparent diffusion plate. Alternatively, in some other embodiments, the transmissive area 163 is configured to have an opening. For example, the diffuser plate has a structure in which a large number of projections or depressions having different sizes are formed on the surface. With the configuration that the transmissive area 163 is a diffuser plate for diffusing light, nonuniformity in blue light and speckles, which are to appear in, e.g., a screen, are reduced.

Returning to FIG. 1, the color wheel 16 includes a drive unit 16m, such as a stepping motor for rotating the color wheel 16, on the axis of the color wheel 16. When the color wheel 16 as a wavelength selector rotates at a predetermined timing with a drive of the drive unit 16m, the incident position of light coming from the first lens group 15 is switched between three areas (segments): the red (R) area 161, the green (G) area 162, and the transmissive area 163. Thus, the color wheel 16 temporally switches the area (segment) between the three areas 161, 162, and 163 to be placed in the optical path of the blue laser light and the fluorescence.

In other words, whether the light incident on the color wheel 16 passes through the color wheel 16 or is reflected by the color wheel 16 is determined by the wavelength of the light condensed by the first lens group 15 and the area (segment) selectively arranged at the incident position of the light from the first lens group 15.

At the timing when the transmissive area 163 is disposed at the incident position of the light coming from the first lens group 15, the blue laser light entering the color wheel 16 passes through the color wheel 16 to become blue illumination light, entering the light tunnel 21. Since the blue illumination light transmitted through the color wheel 16 is circularly polarized light, it is possible to reduce speckle appearing on, e.g., a screen.

Note that the transmissive area 163 is a representative example of a first area according to the embodiment of the present disclosure, and blue illumination light is a representative example of first illumination light according to the embodiments of the present disclosure.

At the timing at which the red (R) area 161 or the green (G) area 162 is set at the incident position of the light coming from the first lens group 15, the blue laser light entering the color wheel 16 is reflected by the color wheel 16. Subsequently, the blue laser light reflected by the color wheel 16 passes through the first lens group 15, entering the quarter wavelength plate 14. The light transmitted through the quarter wavelength plate 14 changes from circularly polarized light to the S wave (S polarized light), and enters the wavelength-selective polarization splitter 13. Note that the S polarized light component is a component orthogonal to the P polarized light component.

The S-wave blue laser light entering the wavelength-selective polarization splitter 13 is reflected by the wavelength-selective polarization splitter 13 and passes through the second lens group 17, entering the phosphor wheel 18. That is, the wavelength-selective polarization splitter 13 guides S-wave (S-polarized light) light to the phosphor wheel 18.

The second lens group 17 is constituted by combining, for example, a biconvex lens and a plano-convex lens as appropriate. The second lens group 17 serves to converge the approximately collimated light beam into a spot on the phosphor wheel 18. The second lens group 17 further serves to collect and change light diverging from the phosphor wheel 18 into a substantially parallel light beam (approximately collimated light beam).

Figure 5:
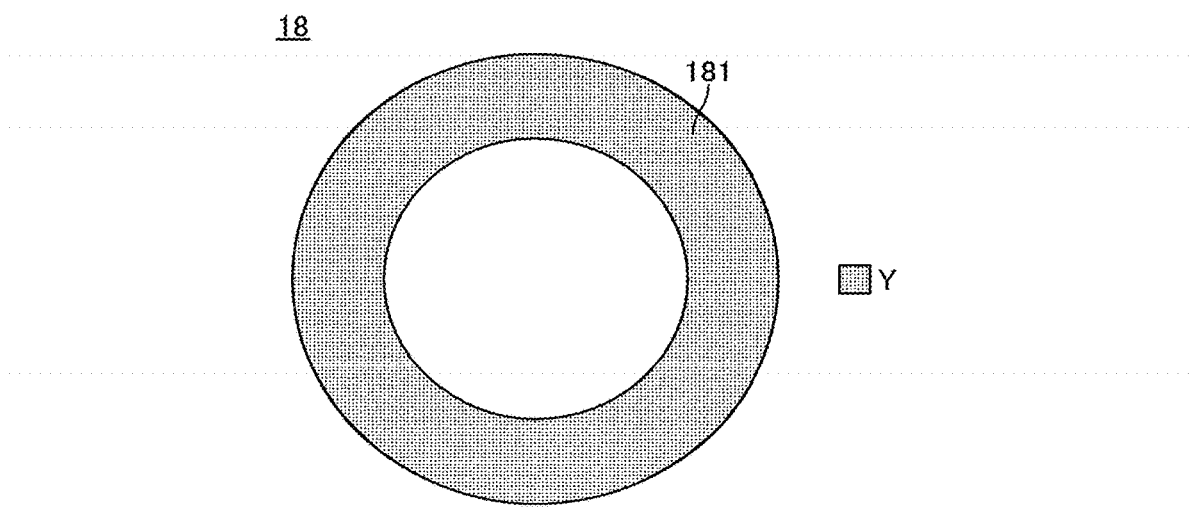
FIG. 5 is an enlarged plan view of a phosphor wheel used in the image projection apparatus in FIG. 1.

FIG. 5 is an enlarged plan view of the phosphor wheel 18 according to the first embodiment when viewed from an incident side of the color wheel 16. As illustrated in FIG. 5, the phosphor wheel 18 used in the present embodiment is a fluorescence generator in which a yellow fluorescent material 181 is formed in a disc-like member along the direction of rotation of a flat plate. The yellow fluorescent material 181 generates yellow fluorescence having a longer wavelength than the blue laser light with the blue laser light as the excitation light.

Returning to FIG. 1, the phosphor wheel 18 includes a drive unit 18m, such as a stepping motor for rotating the phosphor wheel 18, is provided on the axis of the phosphor wheel 18. In the present embodiment, the phosphor wheel 18 may not be movable because a single-color yellow fluorescent material 181 is formed on substantially the entire surface of the phosphor wheel 18. This configuration reduces the size of the phosphor wheel 18 to any shape while reducing the cost because the drive unit 18m is not used. In addition, since the phosphor wheel 18 does not rotate, noise is reduced.

With the blue laser light incident on the phosphor wheel 18 as excitation light, the yellow fluorescent material 181 generates yellow fluorescence. The yellow fluorescence passes through the second lens group 17 and is directed to the wavelength-selective polarization splitter 13. The yellow fluorescence is reflected by the wavelength-selective polarization splitter 13 and is directed to the quarter wavelength plate 14 because the yellow fluorescence has a wavelength of 500 nm or greater. Subsequently, the yellow fluorescence passes through the quarter wavelength plate 14 and the first lens group 15, entering the color wheel 16.

At the timing at which the red (R) area 161 or the green (G) area 162 is set at the incident position of the light coming from the first lens group 15, the yellow fluorescence entering the color wheel 16 passes through the color wheel 16.

For example, at the timing when the red (R) area 161 is disposed at the incident position of the light coming from the first lens group 15, the yellow fluorescence entering the color wheel 16 passes through the color wheel 16 to become red illumination light, entering the light tunnel 21. At the timing when the green (G) area 162 is disposed at the incident position of the light coming from the first lens group 15, the yellow fluorescence entering the color wheel 16 passes through the color wheel 16 to become green illumination light, entering the light tunnel 21.

Note that the red (R) area 161 and the green (G) area 162 are representative examples of a second area according to the embodiment of the present disclosure, and the red illumination light and the green illumination light are representative examples of second illumination light according to the embodiments of the present disclosure.

The light tunnel 21 is a tubular member having a hollow interior. Each illumination light entering the light tunnel 21 repeats reflection inside the light tunnel 21, so that the illuminance distribution becomes uniform at the exit of the light tunnel 21. That is, the light tunnel 21 serves as an illuminance uniforming unit to reduce unevenness in intensity (light amount) of each illumination light. In some embodiments, any other component, such as a fly-eye lens, is used as the illuminance uniforming unit, instead of the light tunnel 21.

Each illumination light of which the illuminance distribution has been uniformed through the light tunnel 21 is relayed to the third lens group 22, and is reflected by the mirror group 23, illuminating the image forming element 24.

The image forming element 24 is an element that forms a color projection image with each illumination light by adjusting gradation for each pixel. The image forming element 24 is, for example, a digital micromirror device (DMD). The DMD has micromirrors on a pixel-by-pixel basis, each micromirror maintaining either one of two different angles.

That is, each micromirror of the DMD has an angle (ON state) at which each illumination light is reflected toward the projection optical section 25 and an angle (OFF state) at which each illumination light is reflected toward the internal absorber so as not to travel to an outside of the image projection apparatus 1. This allows controlling light to be projected for each pixel for display. Further, the DMD is capable of expressing the gradation for each pixel to be displayed by adjusting the time ratio of each micromirror at the ON state, using the pulse width modulation method (PWM method).

Note that the image forming element 24 is not limited to the DMD, but any element capable of forming a color projection image using each illumination light from the illumination device 10 may be used. For example, liquid crystal is used.

In the image projection apparatus 1, the image forming element 24 is irradiated with red, green, and blue illumination light in a time-division manner at the image generation timing in the image forming element 24. After the image forming element 24's gradation adjustment for each pixel to be displayed, the illumination light passes through the projection optical section 25 and is projected onto, e.g., a screen. Then, using the afterimage phenomenon of the eye, a color image is visually recognized on, e.g., a screen.

Note that the light tunnel 21, the third lens group 22, and the mirror group 23 are representative examples of the optical path forming section according to the embodiments of the present disclosure. The image forming element 24 is disposed on the optical path defined by the optical path forming section.

Figure 6:
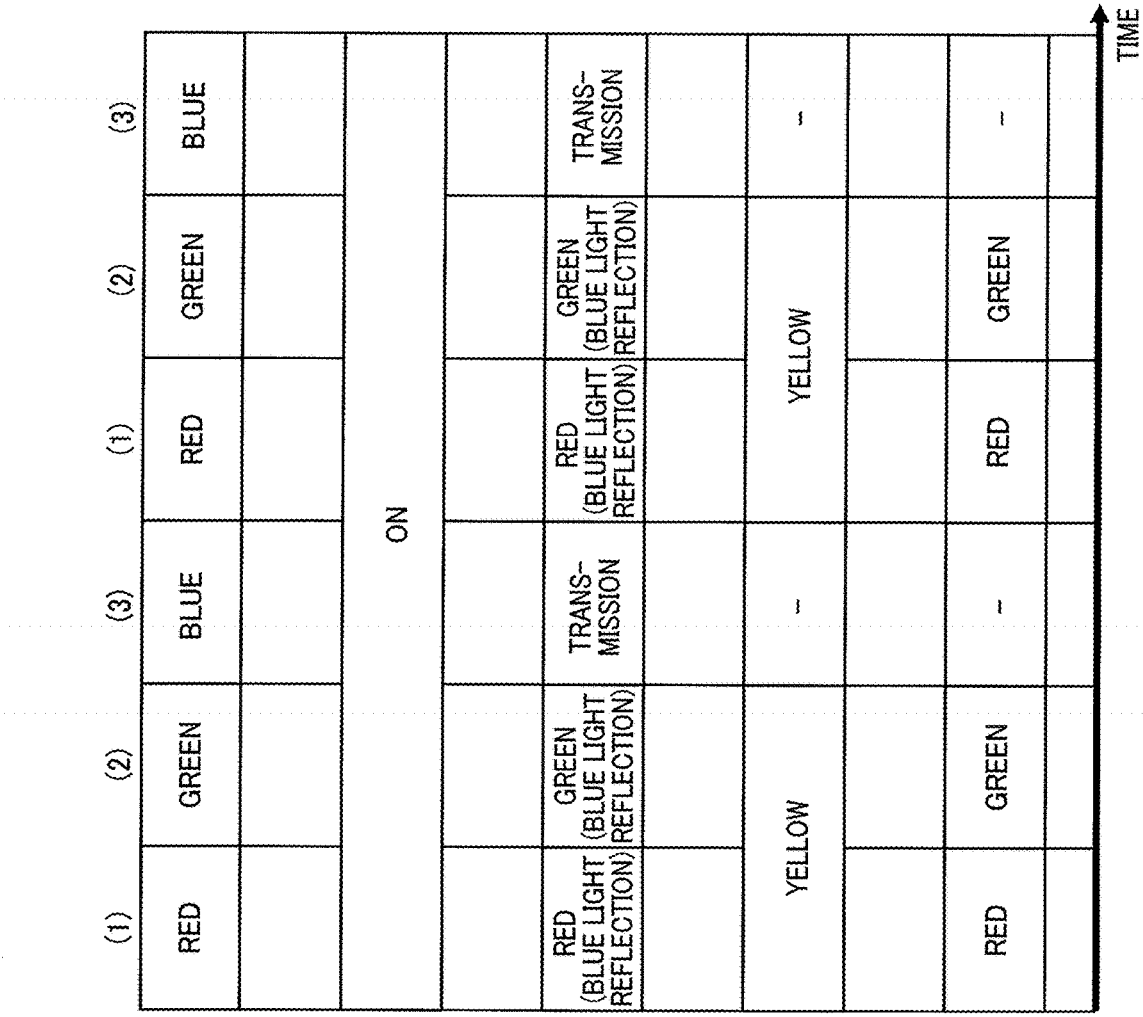
FIG. 6 is a timing chart for taking out each illumination light in a time-division manner in the image projection apparatus in FIG. 1.

Referring to the timing chart of FIG. 6, a description is given of a relation of colors of illumination light, a light-emitting state of the light source 11, a segment (for a first time) of the color wheel 16, a segment of the phosphor wheel 18, and a segment (for a second time) of the color wheel 16.

The light source 11 is turned on (ON) while the red illumination light, the green illumination light, and the blue illumination light are temporally taken out in turn.

In the period of obtaining the red illumination light in (1) of FIG. 6, when the blue laser light from the light source 11 enters the color wheel 16 for the first time, the red (R) area 161 is set at the incident position of the light from the first lens group 15. Accordingly, the blue laser light is reflected by the color wheel 16, and passes through the optical system as described with referring to FIG. 1, entering the phosphor wheel 18.

This allows the yellow fluorescent material 181 to generate yellow fluorescence, and the generated yellow fluorescence passes through the optical system as described above with referring to FIG. 1, entering the color wheel 16 again (for the second time). At this time, the red (R) area 161 remains disposed at the incident position of the light from the first lens group 15 in the color wheel 16. Accordingly, the red fluorescence having entered the color wheel 16 passes through the color wheel 16 and becomes the red illumination light, entering the light tunnel 21 as the red illumination light.

In the period of obtaining the green illumination light in (2) of FIG. 6, when the blue laser light from the light source 11 enters the color wheel 16 for the first time, the green (G) area 162 is set at the incident position of the light from the first lens group 15 on the color wheel 16. Accordingly, the blue laser light is reflected by the color wheel 16, and passes through the optical system as described with referring to FIG. 1, entering the phosphor wheel 18.

This allows the yellow fluorescent material 181 to generate yellow fluorescence, and the generated yellow fluorescence passes through the optical system as described above with referring to FIG. 1, entering the color wheel 16 again (for the second time). At this time, the green (G) area 162 remains disposed at the incident position of the light from the first lens group 15 in the color wheel 16. Accordingly, the yellow fluorescence having entered the color wheel 16 passes through the color wheel 16 and becomes the green illumination light, entering the light tunnel 21 as the green illumination light.

In the period of obtaining the green illumination light in (3) of FIG. 6, when the blue laser light from the light source 11 enters the color wheel 16 for the first time, the transmissive area 163 is set at the incident position of the light from the first lens group 15 on the color wheel 16. Accordingly, the blue laser light passes through the color wheel 16 and becomes the blue illumination light, entering the light tunnel 21 as the blue illumination light. In this case, since the blue laser light emitted from the light source 11 enters and passes through the color wheel 16 as is, for the first time. Thus, the blue laser light does not enter the phosphor wheel 18 (indicated by "—" in (3) of FIG. 6).

Thereafter, (1) through (3) of FIG. 6 are repeated in chronological order. The light source 11, the color wheel 16, the phosphor wheel 18, the image forming element 24, and the like is controlled by a control device disposed at an outside of the image projection apparatus 1.

The control device includes, for example, a central processing unit (CPU), a read only memory (ROM), and a random access memory (RAM) as hardware. Specifically, the control device is implemented by software according to a program preliminarily stored in the ROM, using the RAM as a work memory, so as to control the light source 11, the color wheel 16, the phosphor wheel 18, and the image forming element 24. In some embodiments, the control device is disposed in the interior of the image projection apparatus 1.

As described above, in the image projection apparatus 1, the quarter wavelength plate 14 is disposed on the optical path between the wavelength-selective polarization splitter 13 and the color wheel 16.

Further, the image projection apparatus 1 includes a first optical path through which the blue laser light emitted from the light source 11 sequentially passes through the wavelength-selective polarization splitter 13, the quarter wavelength plate 14, and the color wheel 16, and travels to the light tunnel 21.

The image projection apparatus 1 further includes a second optical path. In the second optical path, the blue laser light emitted from the light source 11 sequentially passes through the wavelength-selective polarization splitter 13 and the quarter wavelength plate 14, and is reflected by the color wheel 16 to travel back to the quarter wavelength plate 14. Subsequently, the blue laser light is converted into S-polarized light in the quarter wavelength plate 14 and passes through the wavelength-selective polarization splitter 13, traveling to the phosphor wheel 18. The phosphor wheel 18 having received the light generates fluorescence. The generated fluorescence travels through the wavelength-selective polarization splitter 13, the quarter wavelength plate 14, and the color wheel 16, and is directed to the light tunnel 21.

Based on the arrangement of the segment in the color wheel 16, the optical path is switched between the first optical path and the second optical path. This configuration allows the optical path from the wavelength-selective polarization splitter 13 to the color wheel 16 to be common therebetween. In other words, it is unnecessary to design so as to bypass one of the two optical paths as in the comparative example, and the illumination device 10 can be downsized.

Further, since no other optical component is disposed between the second lens group 17 and the phosphor wheel 18 in the image projection apparatus 1, a reduction in light utilization efficiency is prevented or reduced, thereby increasing the brightness of an image projected onto, e.g., a screen.

In the present embodiment, measurements are conducted on the optical components to prevent a degradation in image quality. This will be described with reference to FIGS. 7 to 9.

Referring to the timing chart of FIG. 6, the blue laser light is reflected for the first time by the segment (the red (R) area 161 or the green (G) area 162) of the color wheel 16, so as to form red color illumination light in (1) of FIG. 6 or green color illumination light in (2) of FIG. 6. In this case, the reflectance in each of the red (R) area 161 and the green (G) area 162 is not 100% due to the characteristics of the component in actuality. In fact, slight light passes through the color wheel 16 and enters the light tunnel 21.

Figure 7:
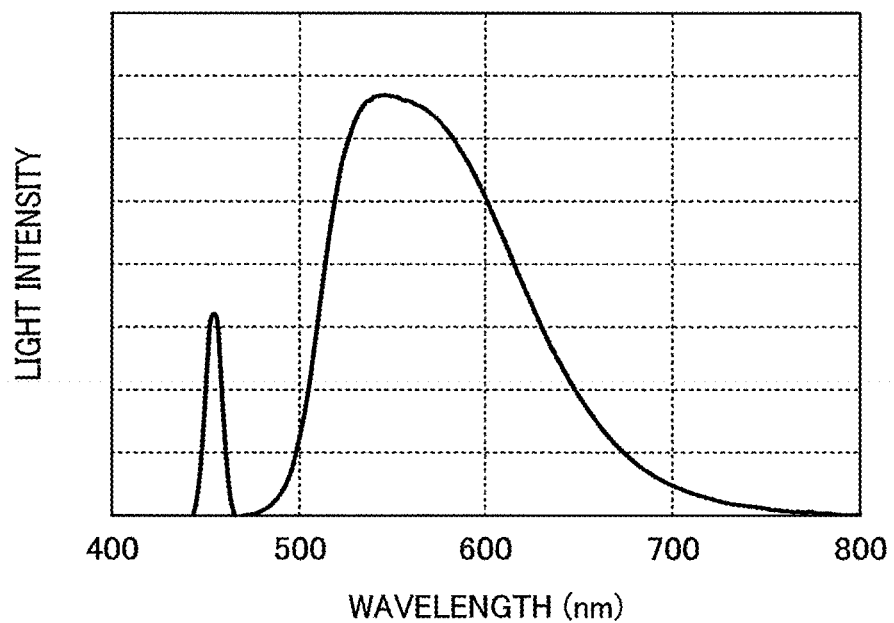
FIG. 7 is a graph for exemplifying a light spectrum obtained when yellow illumination light is projected by an optical system according to a comparative example.

Although it is ideal that only red or green light enters the light tunnel 21 at this timing, blue light also slightly enters the light tunnel 21 for the reasons as described above. As a result, the color projected on the screen is not pure red and green but the color mixed with blue color. Thus, a desired color is not obtained, and thereby image quality is deteriorated. This is represented in FIG. 7. In FIG. 7, although only the yellow color having a peak around 550 nm is desired to be projected, the blue color which peaks around 450 nm is mixed thereto, thereby degrading the color tone.

To handle such circumstances, in the present embodiment, an optical component (mirror or lens) as a part of the optical system is designed to have the optical characteristics such that an average reflectance or an average transmittance of the wavelengths of 400 nm or more and less than 500 nm is lower than an average reflectance or an average transmittance of the wavelengths of 500 nm or more and less than 800 nm.

Figure 8A:
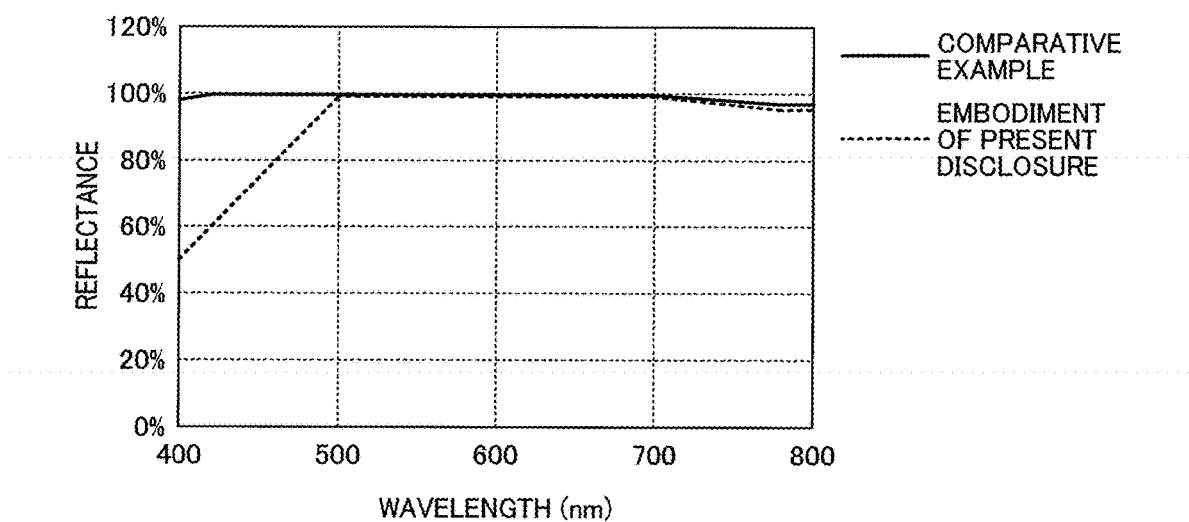
FIGS. 8A and 8B are graphs for exemplifying reflectance and transmittance spectrum of an optical component used in the first embodiment.

Specifically, at any position in the optical path between the exit end of the wavelength-selective polarization splitter 13 and the exit end of the projection optical section 25, a mirror having the optical characteristics (reflectance spectrum) of FIG. 8A is disposed. More specifically, such a mirror has the optical characteristics that an average reflectance of the wavelengths of not less than 400 nm and less than 500 nm is lower than an average reflectance of the wavelengths of not less than 500 nm and less than 800 nm. In this case, any mirror constituting the mirror group 23 in FIG. 1 has the optical characteristics as illustrated in FIG. 8A. Alternatively, in some embodiments, any new mirror is added to the optical system. As illustrated in FIG. 8A, in the comparative embodiment, an optical component in which an average reflectance of the wavelength of 400 nm or more and less than 800 nm is substantially constant (substantially 100%) has been used.

Figure 8B:
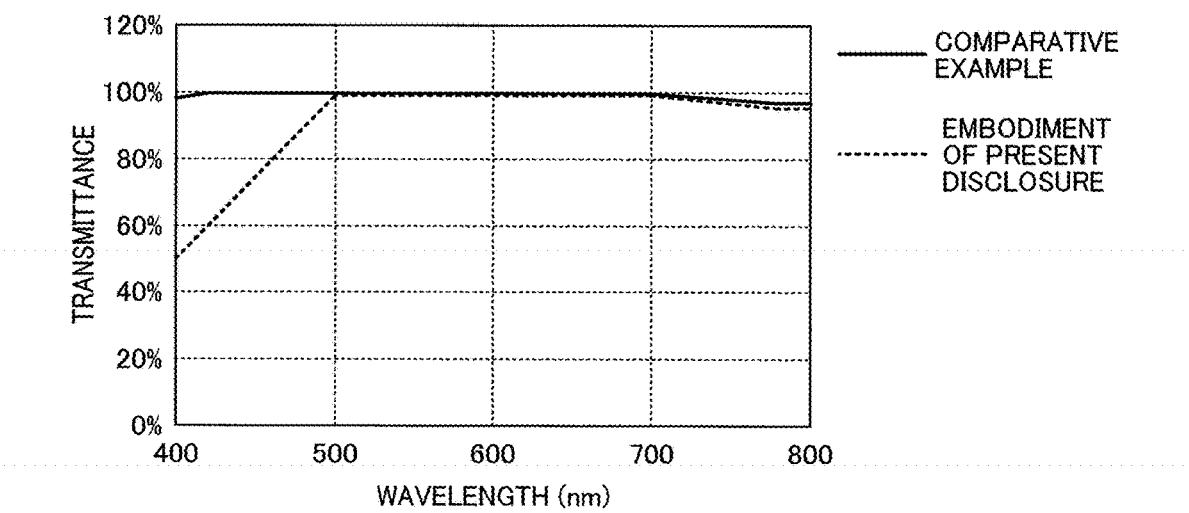

Alternatively, in some embodiments, at any position in the optical path between the exit end of the wavelength-selective polarization splitter 13 and the exit end of the projection optical section 25, a lens having the optical characteristics (transmittance spectrum) of FIG. 8B is disposed. More specifically, such a mirror has the optical characteristics that an average transmittance of the wavelengths of not less than 400 nm and less than 500 nm is lower than an average transmittance of the wavelengths of not less than 500 nm and less than 800 nm. In this case, any lens constituting the first lens group 15 or the third lens group 22 in FIG. 1 has the optical characteristics as illustrated in FIG. 8B. Alternatively, in some embodiments, any new lens is added to the optical system. As illustrated in FIG. 8B, in the comparative embodiment, an optical component in which an average transmittance of the wavelength of 400 nm or more and less than 800 nm is substantially constant (substantially 100%) has been used.

Alternatively, in some embodiments, at any position in the optical path between the exit end of the wavelength-selective polarization splitter 13 and the exit end of the projection optical section 25, both a mirror having the optical characteristics (reflectance spectrum) of FIG. 8A and a lens having the optical characteristics (transmittance spectrum) of FIG. 8B is disposed. The mirror having the reflectance spectrum of FIG. 8A has an average reflectance of the wavelengths of 400 nm or more and less than 500 nm that is lower than an average reflectance of the wavelengths of 500 nm or more and less than 800 nm. The lens having the transmittance spectrum of FIG. 8B has an average transmittance of the wavelengths of 400 nm or more and less than 500 nm that is lower than an average transmittance of the wavelengths of 500 nm or more and less than 800 nm.

Figure 9:
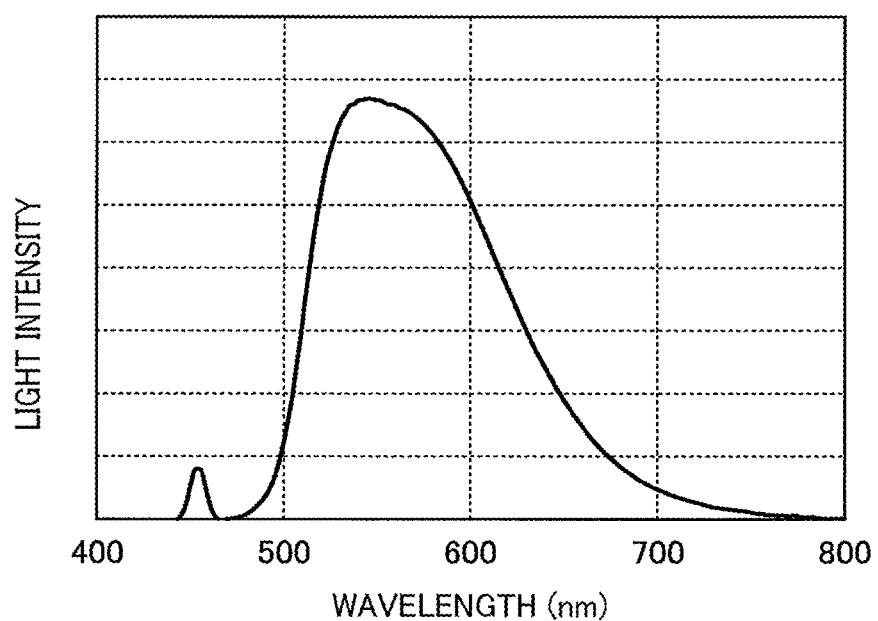
FIG. 9 is a graph for exemplifying a light spectrum obtained when yellow illumination light is projected by an optical system using the optical component having the reflectance and transmittance spectrum of FIGS. 8A and 8B.

By disposing the mirror having the optical characteristics of FIG. 8A or the lens having the optical characteristics of FIG. 8B at any position in the optical path between the exit end of the wavelength-selective polarization splitter 13 and the exit end of the projection optical section 25, the blue light near the wavelength of 450 nm that is unintentionally mixed with light, such as yellow light, is weakened as illustrated in FIG. 9, thereby providing a color change in an appropriate range, thus preventing image quality degradation.

In the image projection apparatus 1 as illustrated in FIG. 1, even when any optical component on a screen side of the wavelength-selective polarization splitter 13 has the optical characteristics of FIG. 8A or FIG. 8B, a certain advantageous effect to reduce the image quality degradation is achieved. In other words, even when the illumination device 10 includes the optical component having the optical characteristics of FIG. 8A or FIG. 8B, even if the illumination device 10 includes optical components having the optical characteristics shown in FIG. 8A or FIG. 8B, a certain advantageous effect to reduce the image quality degradation is achieved.

However, when any optical component on a light-source side of the color wheel 16 has the optical characteristics of FIG. 8A or FIG. 8B, the blue light irradiated to the phosphor wheel 18 is weakened, thereby unsuccessfully reducing the brightness obtained. Therefore, any optical component having the optical characteristics of FIG. 8A or FIG. 8B is arranged in the optical system after the color wheel 16 (on the side of the projection optical section 25 from the color wheel 16).

Further, the image forming element 24 is preferably cooled so as to have a constant temperature. By disposing the optical component having the optical characteristics of FIG. 8A or FIG. 8B in the optical system on the side of the light source 11 from the image forming element 24, the intensity of light irradiated to the image forming element 24 is reduced, thereby advantageously facilitating cooling down the image forming element 24.

Thereafter, the case where the arrangement and characteristics of the color wheel 16 and the wavelength-selective polarization splitter 13 are changed will be described in the following embodiments. In any of the embodiments, the configuration that the optical components as a part of the optical system has the optical characteristics of FIG. 8A or FIG. 8B prevents or reduces image quality deterioration in the image projection apparatus according to each embodiment same as in the image projection apparatus 1.

Note that the optical characteristics (reflectance spectrum) of FIG. 8A is only an example, and may have optical characteristics (reflectance spectrum) different from those of FIG. 8A as long as an average reflectance of the wavelengths of not less than 400 nm and less than 500 nm is lower than an average reflectance of the wavelengths of not less than 500 nm and less than 800 nm. Similarly, the optical characteristic (transmittance spectrum) of FIG. 8B is an example, and if the average transmittance of 400 nm or more and may have optical characteristics (transmittance spectrum) different from those of FIG. 8B as long as an average reflectance of the wavelengths of not less than 400 nm and less than 500 nm is lower than an average reflectance of the wavelengths of not less than 500 nm and less than 800 nm.

Second Embodiment

In the second embodiment, an example using a color wheel different from the first embodiment is described. In the second embodiment, the same structural parts as those of the above-described embodiments are omitted.

Figure 10:
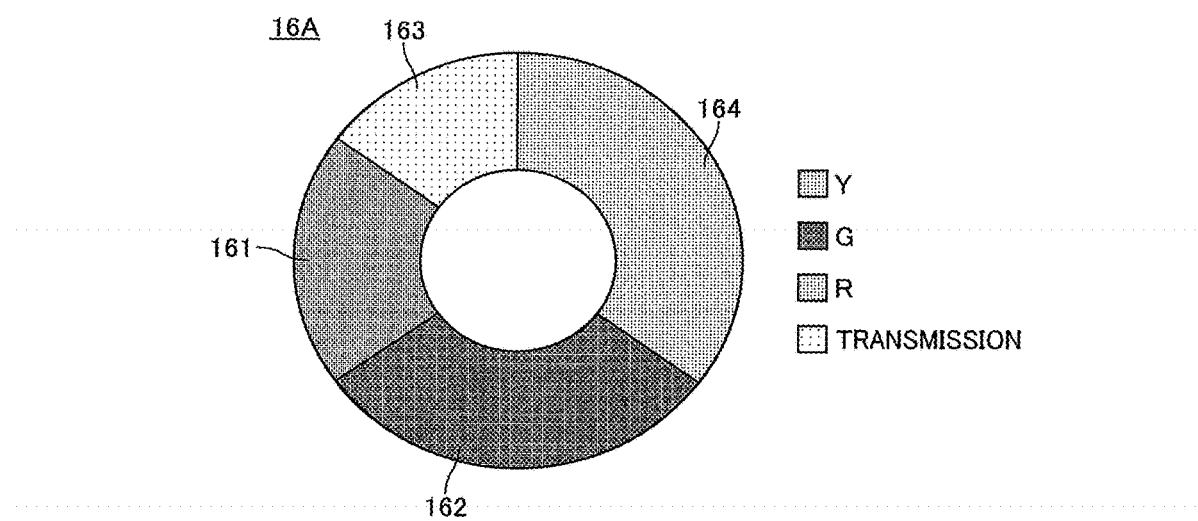
FIG. 10 is an enlarged plan view of a color wheel according to a second embodiment.

FIG. 10 is an enlarged plan view of the color wheel 16 according to the second embodiment when viewed from an incident side of the color wheel 16. In the present embodiment, a color wheel 16A is used in the illumination device 10, instead of the color wheel 16. As illustrated in FIG. 10, the color wheel 16A according to the present embodiment has a configuration in which a disk-shaped member is divided into a plurality of fan-shaped areas (segments). Specifically, the color wheel 16A is divided into four fan-shaped areas (segments) of a red (R) area 161, a green (G) area 162, a transmissive area 163, and a yellow (Y) area 164. Thus, the color wheel 16A differs from the color wheel 16 (see FIG. 3) in that the color wheel 16A further includes the yellow (Y) area 164.

Figure 11:
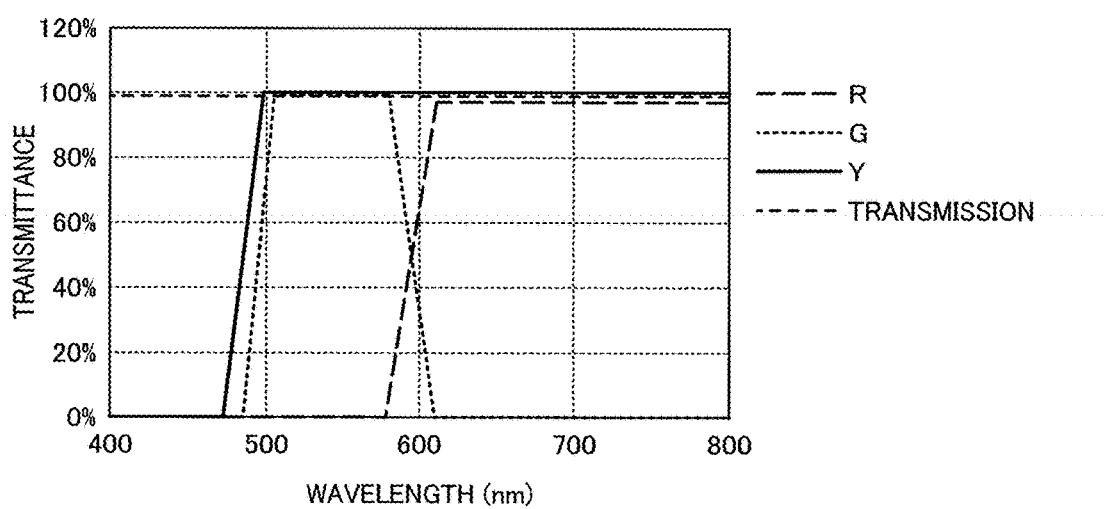
FIG. 11 is a graph for exemplifying spectral transmittance characteristics of the color wheel of FIG. 10.

The color wheel 16A has, for example, spectral transmittance characteristics as illustrated in FIG. 11. The spectral transmittance characteristics of the red (R) area 161, the green (G) area 162, and the transmissive area 163 are the same as in the color wheel 16 of FIG. 4. The yellow (Y) area 164 is an area in which a filter that transmits yellow light is formed. As illustrated in FIG. 11, light in a wavelength range of approximately 500 nm or greater is transmitted through the yellow (Y) area 164, and light in the other wavelength range is reflected by the yellow (Y) area 164.

When the color wheel 16A rotates at a predetermined timing with a drive of the drive unit 16m, the incident position of light coming from the first lens group 15 is switched between four areas (segments): the red (R) area 161, the green (G) area 162, the transmissive area 163, and the yellow (Y) area 164.

Figure 12:
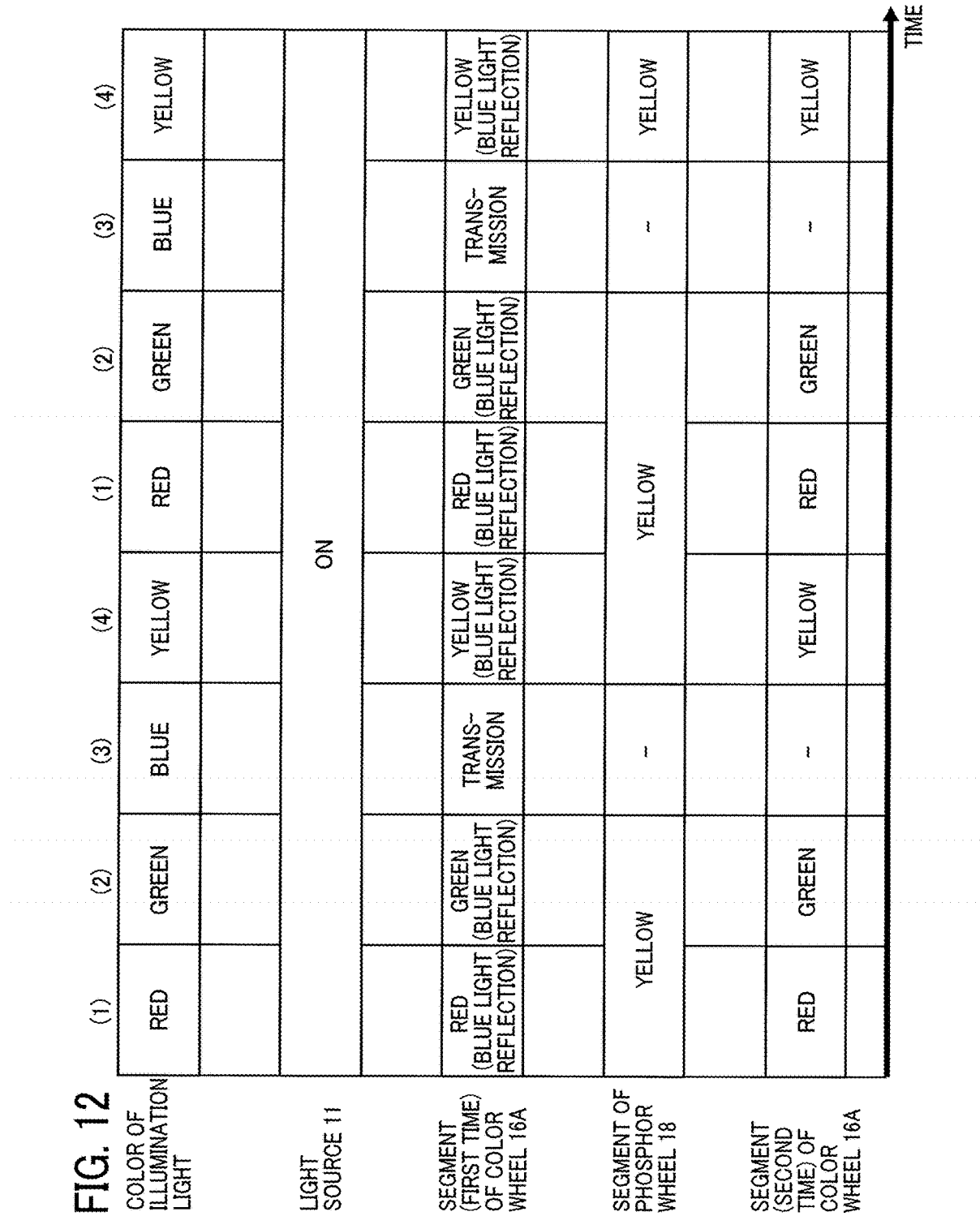
FIG. 12 is a timing chart for taking out each illumination light in a time-division manner in the image projection apparatus according to the second embodiment.

Referring to the timing chart of FIG. 12, a description is given of a relation of colors of illumination light, a light-emitting state of the light source 11, a segment (for a first time) of the color wheel 16A, a segment of the phosphor wheel 18, and a segment (for a second time) of the color wheel 16A.

The light source 11 is turned on (ON) while the red illumination light, the green illumination light, the blue illumination light, and the yellow illumination light are temporally taken out in turn.

The timing chart of a period in which red illumination light is obtained in (1) of FIG. 12, a period in which green illumination light is obtained in (2) of FIG. 12, and a period in which blue illumination light is obtained in (3) of FIG. 12 is the same as that of (1) through (3) of FIG. 6.

In the period of obtaining the yellow illumination light in (4) of FIG. 12, when the blue laser light from the light source 11 enters the color wheel 16A for the first time, the yellow (Y) area 164 is set at the incident position of the light from the first lens group 15 on the color wheel 16A. Accordingly, the blue laser light is reflected by the color wheel 16A, and passes through the optical system as described with referring to FIG. 1, entering the phosphor wheel 18.

This allows the yellow fluorescent material 181 to generate yellow fluorescence, and the generated yellow fluorescence passes through the optical system as described above with referring to FIG. 1, entering the color wheel 16A again (for the second time). At this time, the yellow (Y) area 164 remains disposed at the incident position of the light from the first lens group 15 in the color wheel 16A. Accordingly, the yellow fluorescence having entered the color wheel 16A passes through the color wheel 16 and becomes the yellow illumination light, entering the light tunnel 21 as the yellow illumination light. Thereafter, (1) through (4) of FIG. 12 are repeated in chronological order.

As described above, in some embodiments, the illumination device 11 has the configuration in which the color wheel 16A further includes the yellow (Y) area 164 to obtain the yellow illumination light. Taking out the yellow illumination light increases the brightness of the image projected onto, e.g., a screen.

Third Embodiment

In the third embodiment, a description is given of an example in which there is a change in the characteristics of the phosphor wheel according to the second embodiment. In the third embodiment, the same structural parts as those of the above-described embodiments are omitted.

Figure 13:
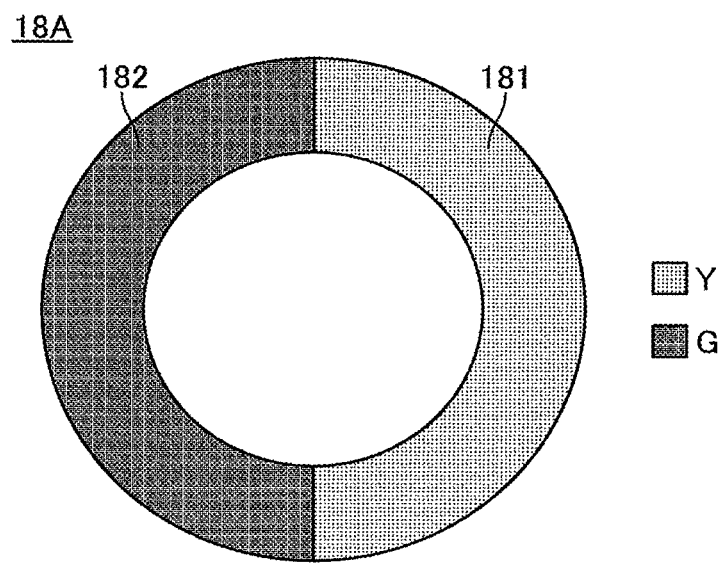
FIG. 13 is an enlarged plan view of a phosphor wheel used in an image projection apparatus according to a third embodiment.

FIG. 13 is an enlarged plan view of the phosphor wheel 18 according to the third embodiment when viewed from an incident side of the phosphor wheel 18. As illustrated in FIG. 13, the phosphor wheel 18A used in the present embodiment is a disk-shaped member divided into a plurality of areas that emit different fluorescence. The phosphor wheel 18A is driven to rotate such that an area to which light from the wavelength-selective polarization splitter 13 is irradiated is sequentially changed.

Specifically, the phosphor wheel 18A has two divided fan-shaped areas (segments): an area in which a yellow fluorescent material 181 emitting yellow (Y) fluorescence is formed and an area in which a green fluorescent material 182 emitting green (G) fluorescence is formed. Thus, the phosphor wheel 18A differs from the phosphor wheel 18 (see FIG. 5) in that the green fluorescent material 182 is formed in the phosphor wheel 18A.

When the phosphor wheel 18A rotates at a predetermined timing by driving of the drive unit 18m, the incident position of the light from the second lens group 17 is switched between areas (segments): the area in which the yellow fluorescent material 181 is formed and the area in which the green fluorescent material 182 is formed.

Figure 14:
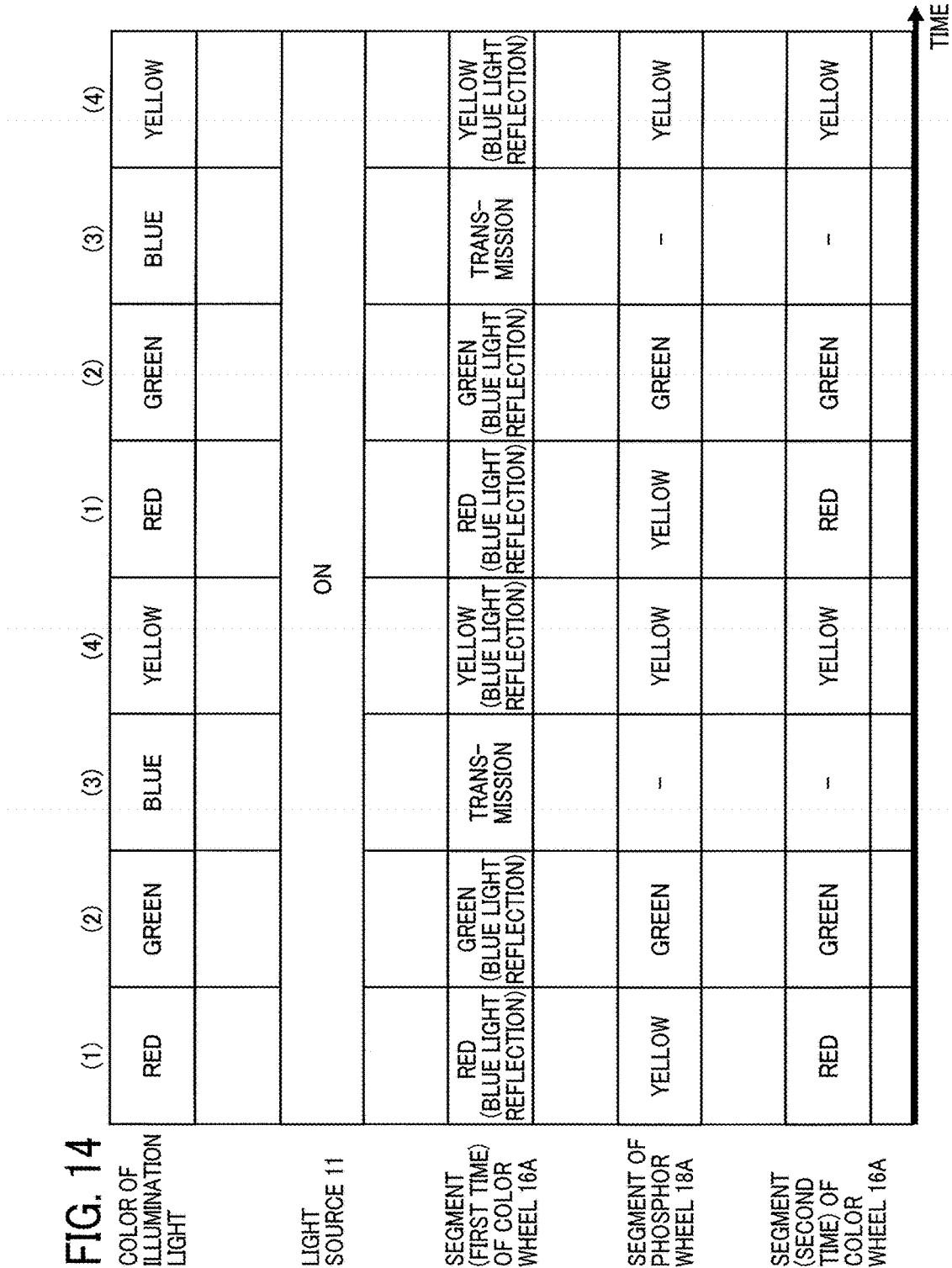
FIG. 14 is a timing chart for taking out each illumination light in a time-division manner in the image projection apparatus according to the third embodiment.

Referring to the timing chart of FIG. 14, a description is given of a relation of colors of illumination light, a light-emitting state of the light source 11, a segment (for a first time) of the color wheel 16A, a segment of the phosphor wheel 18A, and a segment (for a second time) of the color wheel 16A.

The light source 11 is turned on (ON) while the red illumination light, the green illumination light, the blue illumination light, and the yellow illumination light are temporally taken out in turn.

In the period of obtaining the red illumination light in (1) of FIG. 14, when the blue laser light from the light source 11 enters the color wheel 16A for the first time, the red (R) area 161 is set at the incident position of the light from the first lens group 15. This configuration allows the blue laser light to be reflected by the color wheel 16A, and passes through a certain optical system as described with referring to FIG. 1, entering the phosphor wheel 18A.

In such a configuration, the yellow fluorescent material 181 is disposed at the incident position of light from the second lens group 17 in the phosphor wheel 18A. This allows the yellow fluorescent material 181 to generate yellow fluorescence, and the generated yellow fluorescence passes through the optical system as described above with referring to FIG. 1, entering the color wheel 16A again (for the second time). At this time, the red (R) area 161 remains disposed at the incident position of the light from the first lens group 15. Accordingly, the red fluorescence having entered the color wheel 16A passes through the color wheel 16A and becomes the red illumination light, entering the light tunnel 21 as the red illumination light.

In the period of obtaining the green illumination light in (2) of FIG. 14, when the blue laser light from the light source 11 enters the color wheel 16A for the first time, the green (G) area 162 is set at the incident position of the light from the first lens group 15 on the color wheel 16A. This configuration allows the blue laser light to be reflected by the color wheel 16A, and passes through a certain optical system as described with referring to FIG. 1, entering the phosphor wheel 18A.

In such a configuration, the green fluorescent material 182 is disposed at the incident position of light from the second lens group 17 in the phosphor wheel 18A. Accordingly, the green fluorescent material 182 generates green fluorescence, and the generated green fluorescence passes through the optical system as described above with referring to FIG. 1, entering the color wheel 16A again (for the second time). At this time, the green (G) area 162 remains disposed at the incident position of the light from the first lens group 15 in the color wheel 16A. Accordingly, the green fluorescence having entered the color wheel 16A passes through the color wheel 16A and becomes the green illumination light, entering the light tunnel 21 as the green illumination light.

In the period of obtaining the green illumination light in (3) of FIG. 14, when the blue laser light from the light source 11 enters the color wheel 16A for the first time, the transmissive area 163 is set at the incident position of the light from the first lens group 15 on the color wheel 16A. Accordingly, the blue laser light passes through the color wheel 16A and becomes the blue illumination light, entering the light tunnel 21 as the blue illumination light. In this case, since the blue laser light emitted from the light source 11 enters and passes through the color wheel 16A as is, for the first time. Thus, the blue laser light does not enter the phosphor wheel 18A (indicated by "—" in (3) of FIG. 14).

In the period of obtaining the yellow illumination light in (4) of FIG. 14, when the blue laser light from the light source 11 enters the color wheel 16A for the first time, the yellow (Y) area 164 is set at the incident position of the light from the first lens group 15 on the color wheel 16A. Accordingly, the blue laser light is reflected by the color wheel 16A, and passes through the optical system as described with referring to FIG. 1, entering the phosphor wheel 18A.

In this case, the yellow fluorescent material 181 is disposed at the incident position of light from the second lens group 17 in the phosphor wheel 18A. This allows the yellow fluorescent material 181 to generate yellow fluorescence, and the generated yellow fluorescence passes through the optical system as described above with referring to FIG. 1, entering the color wheel 16A again (for the second time). At this time, the yellow (Y) area 164 remains disposed at the incident position of the light from the first lens group 15 in the color wheel 16A. Accordingly, the yellow fluorescence having entered the color wheel 16A passes through the color wheel 16A and becomes the yellow illumination light, entering the light tunnel 21 as the yellow illumination light. Thereafter, (1) through (4) of FIG. 14 are repeated in chronological order.

Even with the configuration that combines the color wheel 16A with the phosphor wheel 18A as described above, the red, green, blue, and yellow illumination light are obtained in a time-division manner. With a use of the phosphor wheel 18A provided with the area to generate yellow fluorescence and the area to generate green fluorescence, the brightness of an image projected on, e.g., a screen is enhanced.

Such an enhancement is achieved for the following reasons. In the case in which the luminous efficiencies of the yellow fluorescent material and the green fluorescent material (the ratio of the emitted light amount (W) to the incident light amount (W)) are about the same, for example, when green color light is generated from the yellow fluorescence using the color wheel as in the first and second embodiments, some light rays are discarded in the color wheel.

Even when the green color fluorescence is used to transmit the green color light through the color wheel as in the present embodiment, a small amount of light is sometimes discarded in the color wheel to adjust the color. However, the amount of discarded light is smaller than the case in which the green color light is made from the yellow fluorescence in the color wheel.

For this reason, the brightness of an image projected onto, e.g., a screen is enhanced in the case in which the green color light is transmitted through the color wheel using the green fluorescence. In this case, since the light amount discarded by the color wheel is reduced, the heat generation of the color wheel is also reduced.

However, when the luminous efficiency of the yellow fluorescence is much higher than the luminous efficiency of the green fluorescence, the luminance is still high even if some light rays are discarded by the color wheel. In this case, for example, the green color light is made from the yellow fluorescence in the color wheel as in the first and second embodiments.

The advantageous effects by taking out the yellow illumination light are the same as in the second embodiment.

Fourth Embodiment

In the fourth embodiment, a description is given of an example in which there is a change in the characteristics of the phosphor wheel according to the third embodiment. In the fourth embodiment, the same structural parts as those of the above-described embodiments are omitted.

Figure 15:
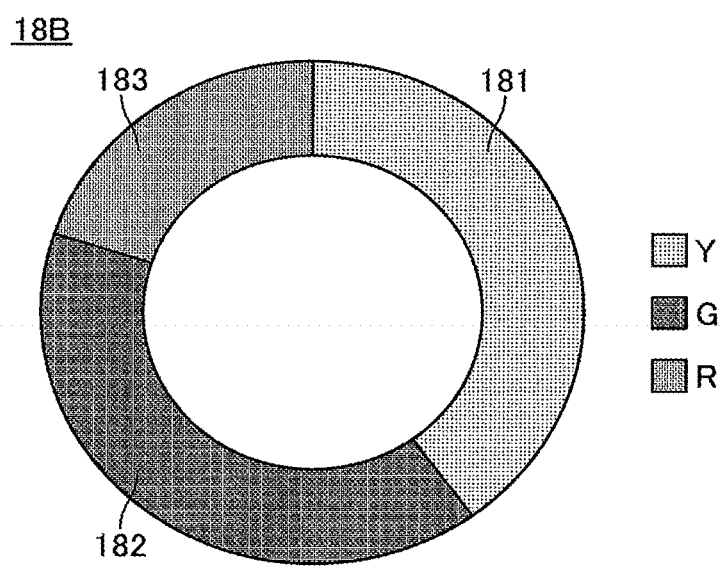
FIG. 15 is an enlarged plan view of a phosphor wheel used in an image projection apparatus according to a fourth embodiment.

FIG. 15 is an enlarged plan view of the phosphor wheel 18 according to the fourth embodiment when viewed from an incident side of the phosphor wheel 18. As illustrated in FIG. 15, the phosphor wheel 18B used in the present embodiment is a disk-shaped member divided into a plurality of areas that emit different fluorescence. The phosphor wheel 18B is driven to rotate such that an area to which light from the wavelength-selective polarization splitter 13 is irradiated is sequentially changed.

Specifically, the phosphor wheel 18B has three divided fan-shaped areas (segments): an area in which a yellow fluorescent material 181 emitting yellow (Y) fluorescence is formed, an area in which a green fluorescent material 182 emitting green (G) fluorescence is formed, and an area in which a red fluorescent material 183 emitting red (R) fluorescence is formed. Thus, the phosphor wheel 18B differs from the phosphor wheel 18A (see FIG. 13) in that the red fluorescent material 183 is formed in the phosphor wheel 18B.

When the phosphor wheel 18B rotates at a predetermined timing by driving of the drive unit 18m, the incident position of the light from the second lens group 17 is switched between areas (segments), the area in which the yellow fluorescent material 181 is formed, the area in which the green fluorescent material 182 is formed, and the area in which the red fluorescent material 183 is formed.

Figure 16:
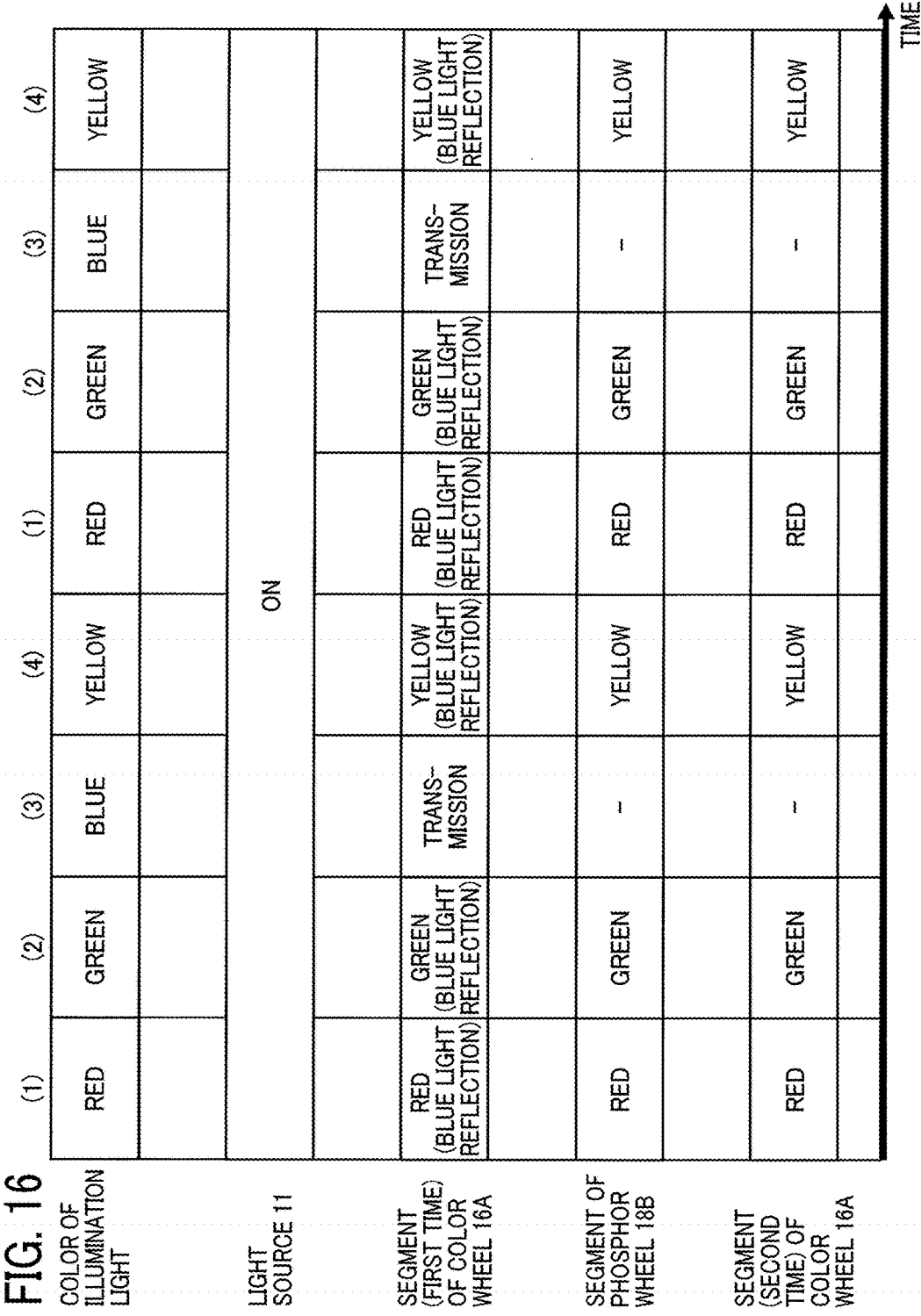
FIG. 16 is a timing chart for taking out each illumination light in a time-division manner in the image projection apparatus according to the fourth embodiment.

Referring to the timing chart of FIG. 16, a description is given of a relation of colors of illumination light, a light-emitting state of the light source 11, a segment (for a first time) of the color wheel 16A, a segment of the phosphor wheel 18B, and a segment (for a second time) of the color wheel 16A.

The light source 11 is turned on (ON) while the red illumination light, the green illumination light, the blue illumination light, and the yellow illumination light are temporally taken out in turn.

In the period of obtaining the red illumination light in (1) of FIG. 16, when the blue laser light from the light source 11 enters the color wheel 16A for the first time, the red (R) area 161 is set at the incident position of the light from the first lens group 15. This configuration allows the blue laser light to be reflected by the color wheel 16A, and passes through a certain optical system as described with referring to FIG. 1, entering the phosphor wheel 18B.

In such a configuration, the red fluorescent material 183 is disposed at the incident position of light from the second lens group 17 in the phosphor wheel 18B. This allows the red fluorescent material 183 to generate red fluorescence, and the generated red fluorescence passes through the optical system as described above with referring to FIG. 1, entering the color wheel 16A again (for the second time). At this time, the red (R) area 161 remains disposed at the incident position of the light from the first lens group 15. Accordingly, the red fluorescence having entered the color wheel 16A passes through the color wheel 16A and becomes the red illumination light, entering the light tunnel 21 as the red illumination light.

The timing chart of a period in which green illumination light is obtained in (2) of FIG. 16, a period in which blue illumination light is obtained in (3) of FIG. 16, and a period in which yellow illumination light is obtained in (4) of FIG. 16 is the same as that of (2) through (4) of FIG. 14. Thereafter, (1) through (4) of FIG. 16 are repeated in chronological order.

Even with the configuration that combines the color wheel 16A with the phosphor wheel 18B as described above, the red, green, blue, and yellow illumination light are obtained in a time-division manner. With a use of the phosphor wheel 18B provided with the area to generate yellow fluorescence, the area to generate green fluorescence, and the area to generate red fluorescence, the brightness of an image projected on, e.g., a screen is enhanced.

Such an enhancement is achieved for the following reasons. In the case in which the luminous efficiencies of the yellow fluorescent material and the red fluorescent material (the ratio of the emitted light amount (W) to the incident light amount (W)) are about the same, for example, when red color light is generated from the yellow fluorescence using the color wheel as in the first through third embodiments, some light rays are discarded with the color wheel.

Even when the red color fluorescence is used to transmit the red color light through the color wheel as in the present embodiment, a small amount of light is sometimes discarded in the color wheel to adjust the color. However, the amount of discarded light is smaller than the case in which the red color light is made from the yellow fluorescence in the color wheel.

For this reason, the brightness of an image projected onto, e.g., a screen is enhanced in the case in which the red color light is transmitted through the color wheel using the red fluorescence. In this case, since the light amount discarded by the color wheel is reduced, the heat generation of the color wheel is also reduced.

The reason why the brightness of the image projected onto, e.g., a screen is enhanced by using the green fluorescence is as described in the third embodiment.

However, when the luminous efficiency of the yellow fluorescence is much higher than the luminous efficiency of the red fluorescence, the luminance is still high even if some light rays are discarded by the color wheel. In this case, for example, the red color light is made from the yellow fluorescence in the color wheel as in the first through third embodiments.

The advantageous effects by taking out the yellow illumination light are the same as in the second embodiment.

Fifth Embodiment

In the fifth embodiment, a description is given of an example in which there is a change in the arrangement of the optical system according to the first embodiment. In the fifth embodiment, the same structural parts as those of the above-described embodiments are omitted.

Figure 17:
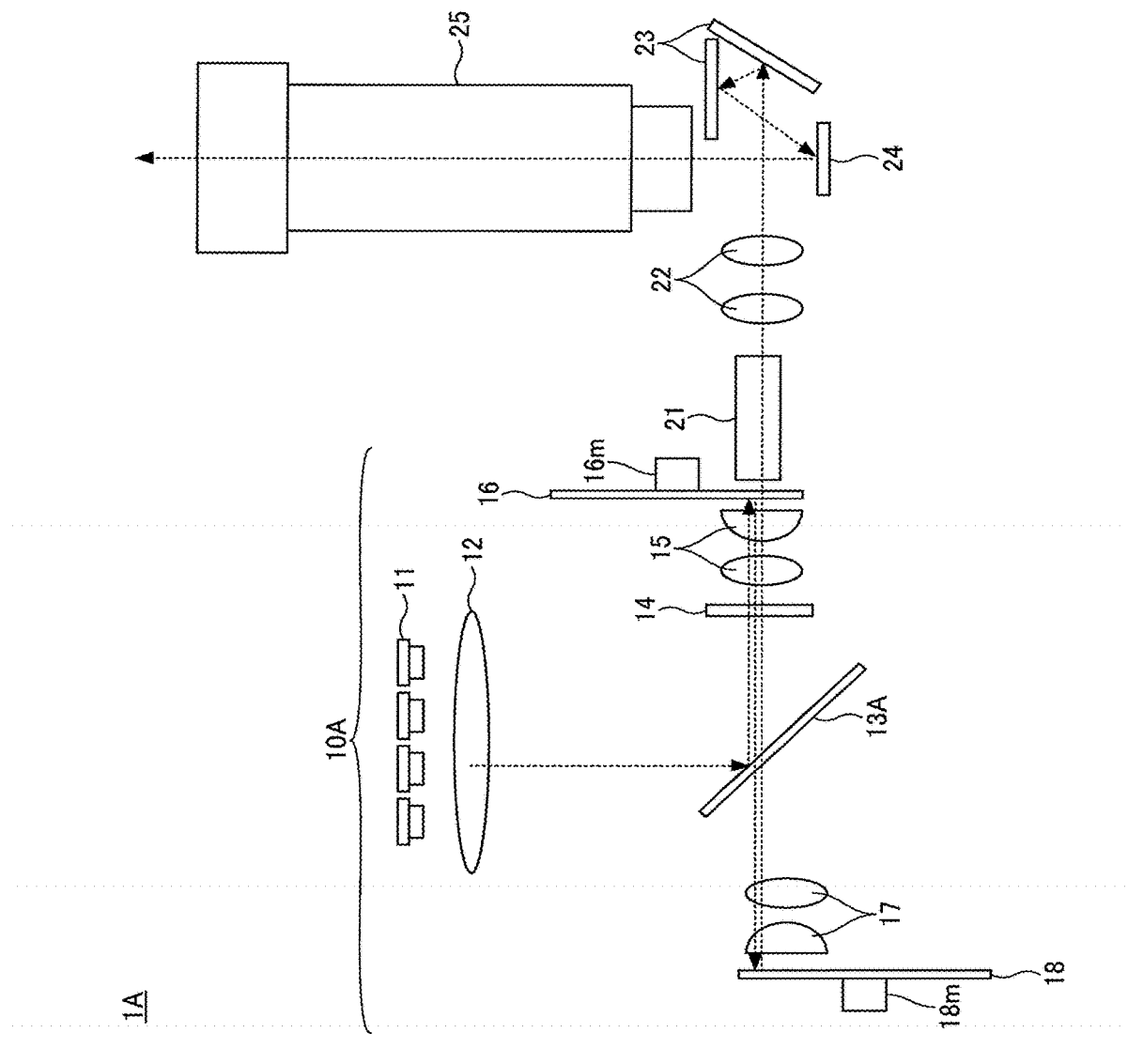
FIG. 17 is a schematic illustration of an example of an image projection apparatus according to a fifth embodiment of the present disclosure.

FIG. 17 is a schematic illustration of an example of an image projection apparatus 1A according to a fifth embodiment of the present disclosure. As illustrated in FIG. 17, the image projection apparatus 1A includes an illumination device 10A, a light tunnel 21, a lens group 22, a mirror group 23, an image forming element 24, and a projection optical section 25. The illumination device 10A differs from the illumination device 10 in the arrangement of the optical system and in that the illumination device 10A includes a wavelength-selective polarization splitter 13A instead of the wavelength-selective polarization splitter 13.

Figure 18:
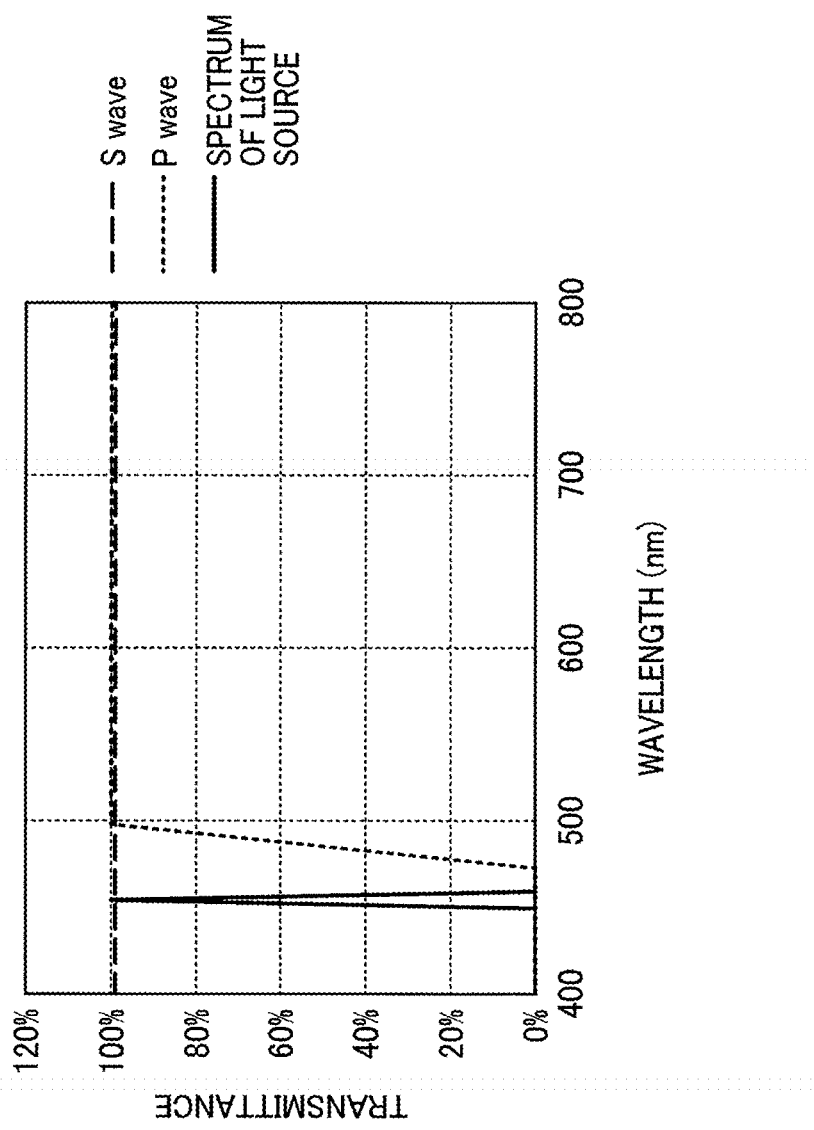
FIG. 18 is a graph for exemplifying spectral transmittance characteristics of a wavelength-selective polarization splitter used in the image projection apparatus in FIG. 17.

The blue laser light emitted from the light source 11 passes through the condenser lens 12 and is directed to the wavelength-selective polarization splitter 13A. The wavelength-selective polarization splitter 13A has, for example, spectral transmittance characteristics as illustrated in FIG. 18.

That is, at the wavelength XB of the light source 11, the wavelength-selective polarization splitter 13A has a characteristic of reflecting the P wave and transmitting the S wave. As can be seen from the spectral transmittance characteristics of FIG. 18, irrespective of whether it is the P wave or the S wave (regardless of polarization characteristics), light having a wavelength of approximately 500 nm or greater is reflected by the wavelength-selective polarization splitter 13A. For example, a polarization beam splitter is used as the wavelength-selective polarization splitter 13A.

As illustrated in FIG. 17, the P-wave blue laser light having entered the wavelength-selective polarization splitter 13A passes through the wavelength-selective polarization splitter 13A, and is directed to the quarter wavelength plate 14. The light transmitted through the quarter wavelength plate 14 becomes circularly polarized light, is collected by the first lens group 15, entering the color wheel 16.

At the timing when the transmissive area 163 is disposed at the incident position of the light coming from the first lens group 15, the blue laser light entering the color wheel 16 passes through the color wheel 16 to become blue illumination light, entering the light tunnel 21.

At the timing at which the red (R) area 161 or the green (G) area 162 is set at the incident position of the light coming from the first lens group 15, the blue laser light entering the color wheel 16 is reflected by the color wheel 16. Subsequently, the blue laser light reflected by the color wheel 16 passes through the first lens group 15, entering the quarter wavelength plate 14. The light transmitted through the quarter wavelength plate 14 changes from circularly polarized light to the S wave (S polarized light), and enters the wavelength-selective polarization splitter 13A.

The S-wave blue laser light having entered the wavelength-selective polarization splitter 13A passes through the wavelength-selective polarization splitter 13A, and is collected by the second lens group 17, entering the phosphor wheel 18.

With the blue laser light incident on the phosphor wheel 18 as excitation light, the yellow fluorescent material 181 generates yellow fluorescence. The yellow fluorescence passes through the second lens group 17 and is directed to the wavelength-selective polarization splitter 13A. The yellow fluorescence passes through the wavelength-selective polarization splitter 13A (see FIG. 18), and further passes through the quarter wavelength plate 14 and the first lens group 15, entering the color wheel 16. The other characteristics in the optical path after the color wheel 16 are the same as in the image projection apparatus 1 in FIG. 1.

As described above, in some embodiments, the optical system is arranged such that the blue laser light emitted from the light source 11 is reflected by the wavelength-selective polarization splitter 13A.

In the arrangement of the optical system as illustrated in FIG. 1, the distance between the light source 11 and the color wheel 16 has to be separated to some extent (to condense the light), which increases the lateral width of the optical system. By contrast, in the arrangement of the optical system in FIG. 17, the light source 11 and the color wheel 16 are not opposed to each other, which allows a reduction in the lateral width of the optical system. That is, the illumination device 10A in FIG. 17 is further reduced in size as compared to the illumination device 10 in FIG. 1.

In the optical system in FIG. 1, since light is reflected twice by the wavelength-selective polarization splitter 13, there is a concern that the brightness might decrease due to the influence of the tolerance attributed to the attachment error of the wavelength-selective polarization splitter 13. By contrast, in the optical system in FIG. 17, since light is reflected only once by the wavelength-selective polarization splitter 13A, the reduction in brightness due to the influence of the tolerance attributed to the attachment error of the wavelength-selective polarization splitter 13A is reduced.

Sixth Embodiment

In the sixth embodiment, a description is given of another example in which there is a change in the arrangement of the optical system according to the first embodiment. In the sixth embodiment, the same structural parts as those of the above-described embodiments are omitted.

Figure 19:
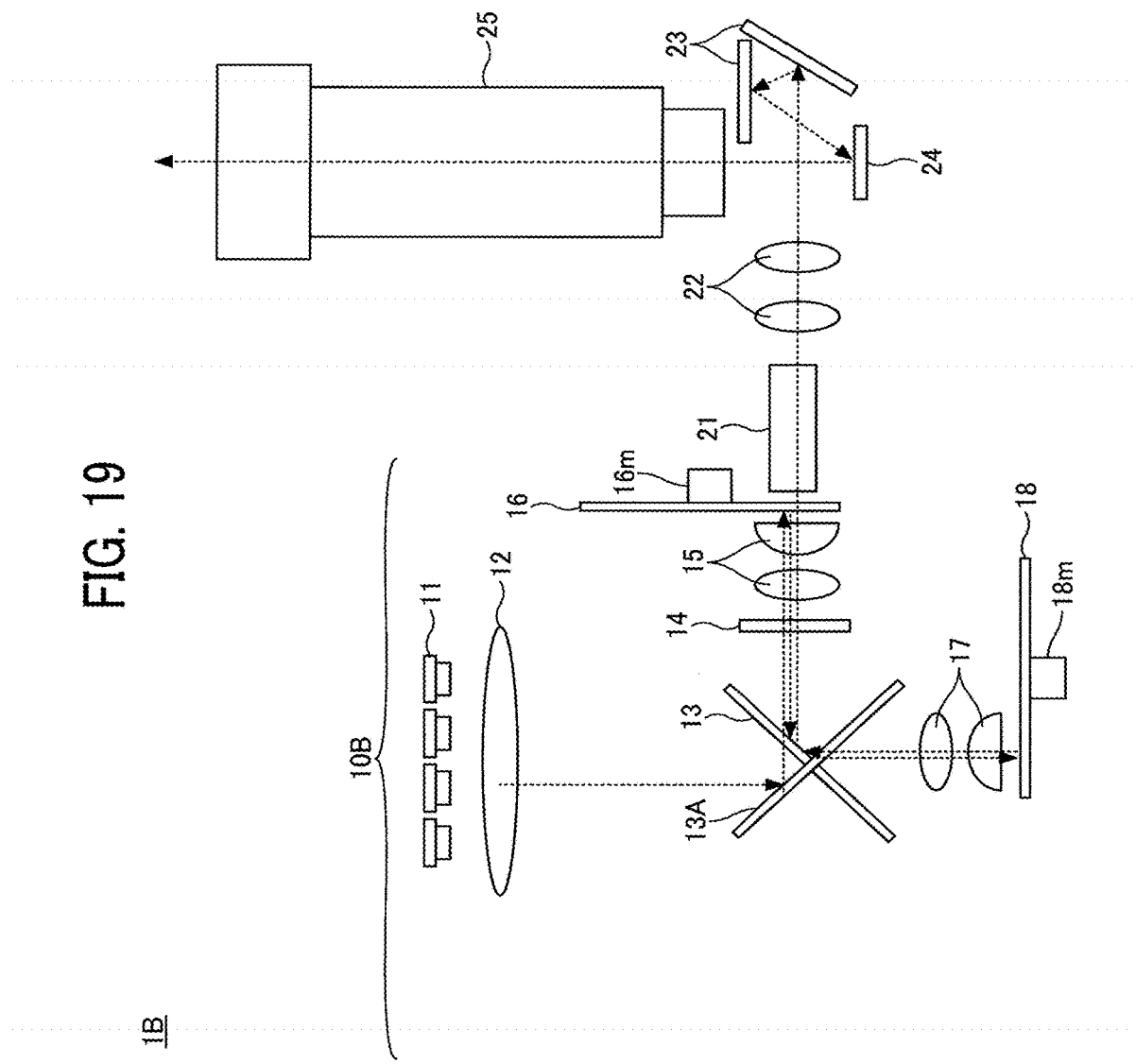
FIG. 19 is a schematic illustration of an example of an image projection apparatus according to a sixth embodiment of the present disclosure.

FIG. 19 is a schematic illustration of an example of an image projection apparatus 1A according to a sixth embodiment of the present disclosure. As illustrated in FIG. 19, the image projection apparatus 1B includes an illumination device 10B, a light tunnel 21, a lens group 22, a mirror group 23, an image forming element 24, and a projection optical section 25. The illumination device 10B differs from the illumination device 10 in the arrangement of the optical system and in that the illumination device 10B includes a wavelength-selective polarization splitter 13A instead of the wavelength-selective polarization splitter 13.

The blue laser light emitted from the light source 11 passes through the condenser lens 12 and is directed to the wavelength-selective polarization splitter 13A. The wavelength-selective polarization splitter 13A has, for example, spectral transmittance characteristics as illustrated in FIG. 18.

The P-wave blue laser light having entered the wavelength-selective polarization splitter 13A passes through the wavelength-selective polarization splitter 13A, and is directed to the quarter wavelength plate 14. The light transmitted through the quarter wavelength plate 14 becomes circularly polarized light, is condensed by the first lens group 15, and enters the color wheel 16.

At the timing when the transmissive area 163 is disposed at the incident position of the light coming from the first lens group 15, the blue laser light entering the color wheel 16 passes through the color wheel 16 to become blue illumination light, entering the light tunnel 21.

At the timing at which the red (R) area 161 or the green (G) area 162 is set at the incident position of the light coming from the first lens group 15, the blue laser light entering the color wheel 16 is reflected by the color wheel 16. Subsequently, the blue laser light reflected by the color wheel 16 passes through the first lens group 15, entering the quarter wavelength plate 14. The light transmitted through the quarter wavelength plate 14 changes from circularly polarized light to the S wave (S polarized light), and enters the wavelength-selective polarization splitter 13.

The S-wave blue laser light entering the wavelength-selective polarization splitter 13 is reflected by the wavelength-selective polarization splitter 13 and collected by the lens group 17, entering the phosphor wheel 18.

With the blue laser light incident on the phosphor wheel 18 as excitation light, the yellow fluorescent material 181 generates yellow fluorescence. The yellow fluorescence passes through the second lens group 17 and is directed to the wavelength-selective polarization splitter 13. The yellow fluorescence is reflected by the wavelength selective polarization splitter 13 (see FIG. 2), and passes through the quarter wavelength plate 14 and the first lens group 15, entering the color wheel 16. The other characteristics in the optical path after the color wheel 16 are the same as in the image projection apparatus 1 in FIG. 1.

As described above, the image projection apparatus 1B includes a wavelength-selective polarization splitter 13 as an optical-path switcher and a wavelength-selective polarization splitter 13A. The wavelength-selective polarization splitter 13 transmits first light having the P polarization component and reflects second light having the S polarization component and fluorescence. The wavelength-selective polarization splitter 13A reflects the first light having the P polarization component and transmits the second light having the S polarization component and the fluorescence.

With such a configuration, there is no need to dispose optical components on the opposite side (in FIG. 19, on the left side of the wavelength-selective polarization splitters 13 and 13A) of the light tunnel 21 of the wavelength-selective polarization splitters 13 and 13A. This configuration allows a further reduction in the illumination device 10B as compared to the illumination device 10 or 10A as a result.

Note that the wavelength-selective polarization splitter 13 is a representative example of a first polarization splitter according to the embodiments of the present disclosure, and the wavelength-selective polarization splitter 13A is a representative example of a second polarization splitter according to the embodiments of the present disclosure.

Although the preferred embodiments have been described in detail above, the present disclosure is not limited to the above-described embodiments, and various modifications and substitutions may be made to the above-described embodiments without departing from the scope described in the claims.

For example, in some embodiments, the first linearly polarized light component of the light source 11 is an S-polarized light component. In this case, the transmission and reflection characteristics of P-polarized light and S-polarized light in the wavelength-selective polarization splitter 13 or 13A are reversed to each other.

Further, in some embodiments, any of the embodiments are appropriately combined. For example, in some embodiments, the illumination device 10A in FIG. 17 or the illumination device 10B in FIG. 19 includes the color wheel 16A, the phosphor wheel 18A or 18B used.

The illumination device according to each embodiment is applicable in a project as an example of an image projection apparatus. However, no limitation is intended thereby. The illumination device according to each embodiment is applicable in, for example, a heads-up display (HUD) or a head mount display (HMD).

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image projection apparatus comprising:
   an illumination device including:
      a light source to emit first light having a first linear polarization component;

a fluorescence generator to generate, with excitation light of the first light, fluorescence having a wavelength longer than a wavelength of the first light;
a wavelength selector having:
  a first area to transmit the first light through the first area; and
  a second area to reflect the first light and transmit the fluorescence through the second area;
a polarization converter to alternately change the first light between linearly polarized light and circular polarized light; and
an optical-path switcher to guide the first light and the fluorescence to the polarization converter while guiding second light having a second linear polarization component perpendicular to the first linear polarization component to the fluorescence generator;
an optical-path forming section to define an optical path of illumination light emitted from the illumination device;
an image forming element disposed in the optical path of the illumination light to form an image with the illumination light;
a projection optical section to project the image to an outside of the image projection apparatus; and
an optical component disposed in an optical path from an exit end of the optical-path switcher to an exit end of the projection optical section,
the optical component being one of:
  a mirror having an average reflectance of wavelengths of 400 nm or more and less than 500 nm being lower than an average reflectance of wavelengths of 500 nm or more and less than 800 nm; and
  a lens having an average transmittance of wavelengths of 400 nm or more and less than 500 nm being lower than an average transmittance of wavelengths of 500 nm or more and less than 800 nm,
wherein the wavelength selector alternately sets the first area and the second area in an optical path of the first light in a temporal manner, and
wherein the illumination device switches a first optical path and a second optical path based on a setting of the wavelength selector:
in the first optical path, the first light sequentially passes through the optical-path switcher, the polarization converter, and the first area of the wavelength selector to become first illumination light, and
in the second optical path, the first light sequentially passes through the optical-path switcher and the polarization converter and is reflected by the second area of the wavelength selector, the first light is changed to the second light by the polarization converter, the second light passes through the optical-path switcher and is directed to the fluorescence generator to generate fluorescence, the fluorescence sequentially passes through the optical-path switcher, the polarization converter, and the second area of the wavelength selector to become second illumination light and travel in a direction same as a direction of the first illumination light.

2. The image projection apparatus according to claim 1, wherein the optical component is disposed on a side of the light source from the image forming element in an optical system of the image projection apparatus.

3. The image projection apparatus to claim 1, wherein the optical component is disposed on a side of the projection optical section from the wavelength selector in an optical system.

4. The image projection apparatus according to claim 1, wherein the light source is a laser that emits blue light.

5. The image projection apparatus according to claim 1, wherein operations of the light source, the wavelength selector, the fluorescence generator, and the image forming element are controlled by circuitry.

6. An illumination device comprising:
a light source to emit first light having a first linear polarization component;
a fluorescence generator to generate, with excitation light of the first light, fluorescence having a wavelength longer than a wavelength of the first light;
a wavelength selector having:
  a first area to transmit the first light through the first area; and
  a second area to reflect the first light and transmit the fluorescence through the second area;
a polarization converter to alternately change the first light between linearly polarized light and circular polarized light;
an optical-path switcher to guide the first light and the fluorescence to the polarization converter while guiding second light having a second linear polarization component perpendicular to the first linear polarization component to the fluorescence generator; and
an optical component disposed in an optical path from an exit end of the optical-path switcher to an exit end of the wavelength selector,
the optical component being one of:
  a mirror having an average reflectance of wavelengths of 400 nm or more and less than 500 nm being lower than an average reflectance of wavelengths of 500 nm or more and less than 800 nm; and
  a lens having an average transmittance of wavelengths of 400 nm or more and less than 500 nm being lower than an average transmittance of wavelengths of 500 nm or more and less than 800 nm,
wherein the wavelength selector alternately sets the first area and the second area in an optical path of the first light in a temporal manner, and
wherein a first optical path and a second optical path are switched based on a setting of the wavelength selector:
in the first optical path, the first light sequentially passes through the optical-path switcher, the polarization converter, and the first area of the wavelength selector to become first illumination light, and
in the second optical path, the first light sequentially passes through the optical-path switcher and the polarization converter and is reflected by the second area of the wavelength selector, the first light is changed to the second light by the polarization converter, the second light passes through the optical-path switcher and is directed to the fluorescence generator to generate fluorescence, the fluorescence passes through sequentially passes through the optical-path switcher, the polarization converter, and the second area of the wavelength selector to become second illumination light and travel in a direction same as a direction of the first illumination light.

7. The illumination device according to claim 6, wherein the light source is a laser that emits blue light.

* * * * *